United States Patent
Nakamura

(10) Patent No.: US 11,313,172 B2
(45) Date of Patent: Apr. 26, 2022

(54) ROTARY FITTING

(71) Applicant: Yazaki Energy System Corporation, Tokyo (JP)

(72) Inventor: Takuju Nakamura, Tokyo (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 112 days.

(21) Appl. No.: 16/911,510

(22) Filed: Jun. 25, 2020

(65) Prior Publication Data

US 2020/0326136 A1 Oct. 15, 2020

Related U.S. Application Data

(63) Continuation of application No. PCT/JP2018/045325, filed on Dec. 10, 2018.

(30) Foreign Application Priority Data

Dec. 26, 2017 (JP) .............................. JP2017-248817

(51) Int. Cl.
*E06B 3/67* (2006.01)
*F25B 15/00* (2006.01)
(Continued)

(52) U.S. Cl.
CPC .......... *E06B 3/6715* (2013.01); *F25B 15/004* (2013.01); *F28D 20/02* (2013.01);
(Continued)

(58) Field of Classification Search
CPC ............. E06B 3/6715; E06B 2003/343; E06B 2003/345; E06B 3/50; E06B 3/54;
(Continued)

(56) References Cited

U.S. PATENT DOCUMENTS 3,925,945 A * 12/1975 White ................... E06B 3/2605
165/48.2
4,365,620 A * 12/1982 Bliamptis ................. E06B 3/40
126/633
(Continued)

FOREIGN PATENT DOCUMENTS

CN 101967943 A 2/2011
JP 25-3886 Y1 6/1925
(Continued)

*Primary Examiner* — Devon Russell
(74) *Attorney, Agent, or Firm* — Sughrue Mion, PLLC

(57) ABSTRACT

A pivot window includes a laminated body capable of rotating in a state where a first plate material is directed outdoors and in a state where a second plate material is directed outdoors. The laminated body uses at least one of solar heat, atmospheric heat, and atmospheric humidity, and provides a humidity control effect to the room in both of the state where the first plate material is directed outdoors and the state where the second plate material is directed outdoors. The laminated body is not limited to the one providing the humidity control effect, but may be the one providing a temperature control effect. The laminated body may use the concentration of a specific gas in the atmosphere such as atmospheric oxygen concentration, atmospheric carbon dioxide concentration, and atmospheric volatile organic compound (VOC) concentration, and may provide a component concentration adjusting effect to the room.

1 Claim, 14 Drawing Sheets

(51) Int. Cl.
*F28D 20/02* (2006.01)
*F28D 20/00* (2006.01)

(52) U.S. Cl.
CPC .... *F28D 20/023* (2013.01); *F28D 2020/0008* (2013.01); *F28D 2020/0078* (2013.01); *Y02B 80/22* (2013.01)

(58) Field of Classification Search
CPC ...... Y02B 30/54; Y02B 80/22; Y02A 30/249; F28D 20/02; F28D 20/023; F28D 2020/0008; F28D 2020/0078; F28D 2020/0013
See application file for complete search history.

(56) References Cited

U.S. PATENT DOCUMENTS

| | | | | |
|---|---|---|---|---|
| 5,398,446 | A * | 3/1995 | Kunert | E06B 3/6715 49/169 |
| 6,319,599 | B1 * | 11/2001 | Buckley | A41D 31/065 428/308.4 |
| 2008/0017352 | A1 * | 1/2008 | Brower | F24F 5/0017 165/96 |

FOREIGN PATENT DOCUMENTS

| | | | |
|---|---|---|---|
| JP | 25-3886 Y1 | 6/1950 | |
| JP | 2013-23977 A | 2/2013 | |
| JP | 2016-30964 A | 3/2016 | |
| WO | 2015/059005 A1 | 4/2015 | |

\* cited by examiner

ROTARY FITTING

CROSS REFERENCE TO RELATED APPLICATIONS

This application is a continuation of PCT application No. PCT/JP2018/045325, which was filed on Dec. 10, 2018 based on Japanese patent application 2017-248817 filed on Dec. 26, 2017, whose contents are incorporated herein by reference. Also, all the references cited herein are incorporated as a whole.

BACKGROUND OF THE INVENTION

1. Technical Field

The present invention relates to a rotary fitting.

2. Background Art

In a related art, proposed is a fitting including a rotary body having a heat storage layer on one surface and a heat insulating layer on the other surface (refer to Patent Literature 1). In this fitting, heat obtained from solar light is stored in the heat storage layer by directing the heat storage layer to the outdoor side, after which the heat storage layer is directed to the indoor side, whereby the heat can be discharged from the heat storage layer into the room while preventing radiation cooling from the room by the heat insulating layer.

CITATION LIST

Patent Literature

[Patent Literature 1] JP-A-2016-030964

SUMMARY

Here, in the fitting described in Patent Literature 1, when the heat storage layer is directed to the indoor side after the heat storage, the room can be warmed by using the heat from the heat storage layer, but the rotary body functions only as a simple heat insulating material while the heat storage layer is directed to the outdoor side, whereby it becomes impossible to obtain an air conditioning effect (temperature adjusting effect, humidity adjusting effect, or component concentration adjusting effect) in the room.

The present invention has been made to solve the above-described problem, and an object thereof is to provide a rotary fitting capable of providing an air conditioning effect to the indoor side even though any one of surfaces becomes the outdoor side.

Solution to Problem

A rotary fitting according to the present invention includes a flat plate body capable of rotating in a state where a first surface is directed outdoors and a state where a second surface is directed outdoors. The flat plate body uses at least one of solar heat, atmospheric heat, atmospheric humidity, and the concentration of a specific gas in the atmosphere such as atmospheric oxygen concentration, atmospheric carbon dioxide concentration, and atmospheric volatile organic compound (VOC) concentration, and provides an air conditioning effect to the room in both of the state where the first surface is directed outdoors and the state where the second surface is directed outdoors.

According to the present invention, since an air conditioning effect is provided to the room in both of a state where a first surface is directed outdoors and a state where a second surface is directed outdoors, there is no case in which the temperature, humidity, and component concentration cannot be voluntarily adjusted by exerting only a heat insulating effect when one surface becomes the outdoor side, and the air conditioning effect can be provided to the indoor side even though any one of surfaces becomes the outdoor side.

BRIEF DESCRIPTION OF THE DRAWINGS

FIGS. 13A and 13B are first enlarged views illustrating one of plurality of cells, in which FIG. 13A illustrates a first state, and FIG. 13B illustrates a second state when the cell is half rotated in a vertical direction.

FIGS. 14A and 14B are second enlarged views illustrating one of e plurality of cells, in which FIG. 14A illustrates a first state, and FIG. 14B illustrates a second state when the cell is half rotated in the vertical direction.

DETAILED DESCRIPTION OF EMBODIMENTS

Hereinafter, the present invention will be described with reference to preferred embodiments. The present invention is not limited to the embodiments described below, and can be appropriately modified within a range not departing from the spirit of the present invention. In the embodiments described below, there may be a portion in which a part of configuration will not be illustrated and description thereof will be omitted, but with respect to details of an omitted technology, it goes without saying that a publicly known or well-known technology is appropriately applied within a range not causing inconsistency with a content described below.

Figure 1:
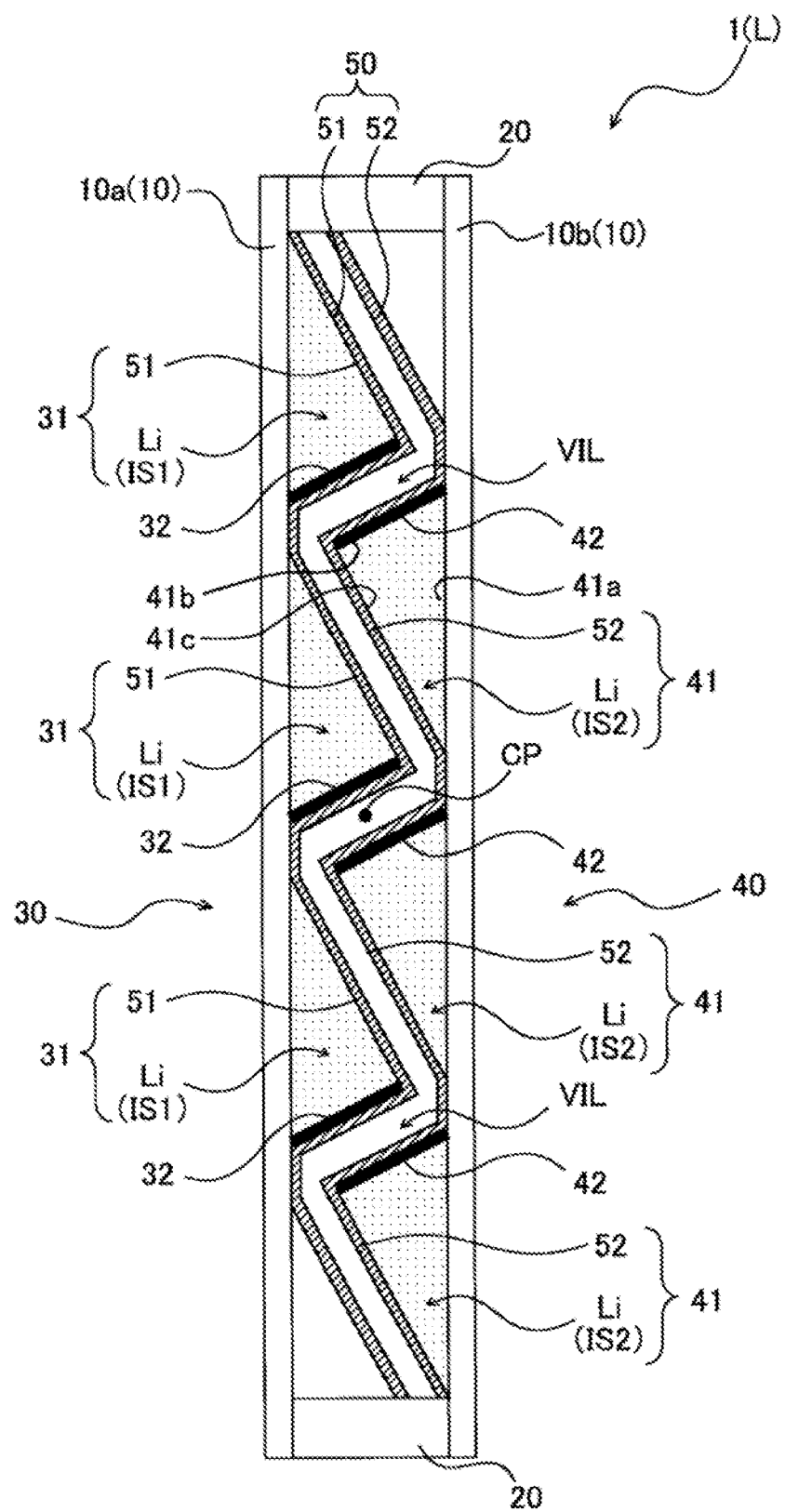
FIG. 1 is a cross-sectional view illustrating a pivot window according to a first embodiment of the present invention.

FIG. 1 is a cross-sectional view illustrating a pivot window according to a first embodiment of the present invention. Hereinafter, the pivot window applicable as a window (regardless of whether the window is opened or closed) will be described as an example of a rotary fitting, and the rotary fitting is not limited to the one applied to the pivot window, but may be a rotating outer wall material.

A pivot window 1 according to the example illustrated in FIG. 1 includes roughly two sheets of a plate material 10, a vacuum sealing member 20, a first unit 30, a second unit 40, and two sheets of an isolation wall 50.

The two sheets of the plate material 10 are transparent and water vapor permeable plate materials disposed almost in parallel with each other. These plate materials 10 are formed of, for example, a humidity-permeable polyurethane resin used for a porous glass, a silicone, and a surgical film, and a humidity-permeable water-tight film such as Tyvek (registered trademark).

The vacuum sealing member 20 is interposed between the two sheets of the plate material 10 at peripheral end parts of the two sheets of the plate material 10. The vacuum sealing member 20 is provided at the peripheral end parts of the two sheets of the plate material 10, thereby forming art internal space closed by the two sheets of the plate material 10 and the vacuum sealing member 20.

The first unit 30 and the second unit 40 are disposed in the internal space formed by the two sheets of the plate material 10 and the vacuum sealing member 20. The first unit 30 and the second unit 40 are air-tightly separated by the two sheets of the isolation wall 50. These two sheets of the isolation wall 50 are formed of a transparent plate material, and are separated from each other so that the side of the first plate material (first surface and one plate material) 10a of the two sheets of the plate material 10 is defined as the first unit 30, and the side of the second plate material (second surface and the other plate material) 10b of the two sheets of the plate material 10 is defined as the second unit 40. A vacuum insulating layer (isolation layer) VIL is formed between the two sheets of the isolation wall 50.

More specifically, both of the two sheets of the isolation wall 50 have a zigzag shape in a cross-sectional view, and a plurality of first internal spaces IS1 are formed by a first wall 51 of the two sheets of the isolation wall 50 and the first plate material 10a. Each of the plurality of first internal spaces IS1 has a triangular shape in a cross-sectional view. The first internal space IS1 is filled with a hygroscopic liquid Li. As a result, the hygroscopic liquid Li and the first wall 51 form a first triangular prism 31. The first unit 30 is formed of a plurality of first triangular prisms 31 and a plurality of first selective absorption parts (first solar heat receiving parts) 32 which will be described later. In the following description, an example in which the first internal space IS1 is filled with the hygroscopic liquid Li will be described, but the present invention is not limited to the liquid Li, and the first triangular prism 31 may be formed by encapsulating a hygroscopic solid and a gel-like body into the first internal space IS1.

In the same manner, a plurality of second internal spaces IS2 are formed by a second wall 52 of the two sheets of the isolation wall 50 and the second plate material 10b. Each of the plurality of second internal spaces IS2 has a triangular shape in a cross-sectional view. The second internal space IS2 is filled with the hygroscopic liquid Li. As a result, the hygroscopic liquid Li and the second wall 52 form a second triangular prism 41. The second unit 40 is formed of a plurality of second triangular prisms 41 and a plurality of second selective absorption parts (second solar heat receiving parts) 42 which will be described later. Even in the following description, an example in which the second internal space IS2 is filled with the hygroscopic liquid Li will be described, but the present invention is not limited to the liquid Li, and the second triangular prism 41 may be formed by encapsulating the hygroscopic solid and the gel-like body into the second internal space IS2.

Figure 2:
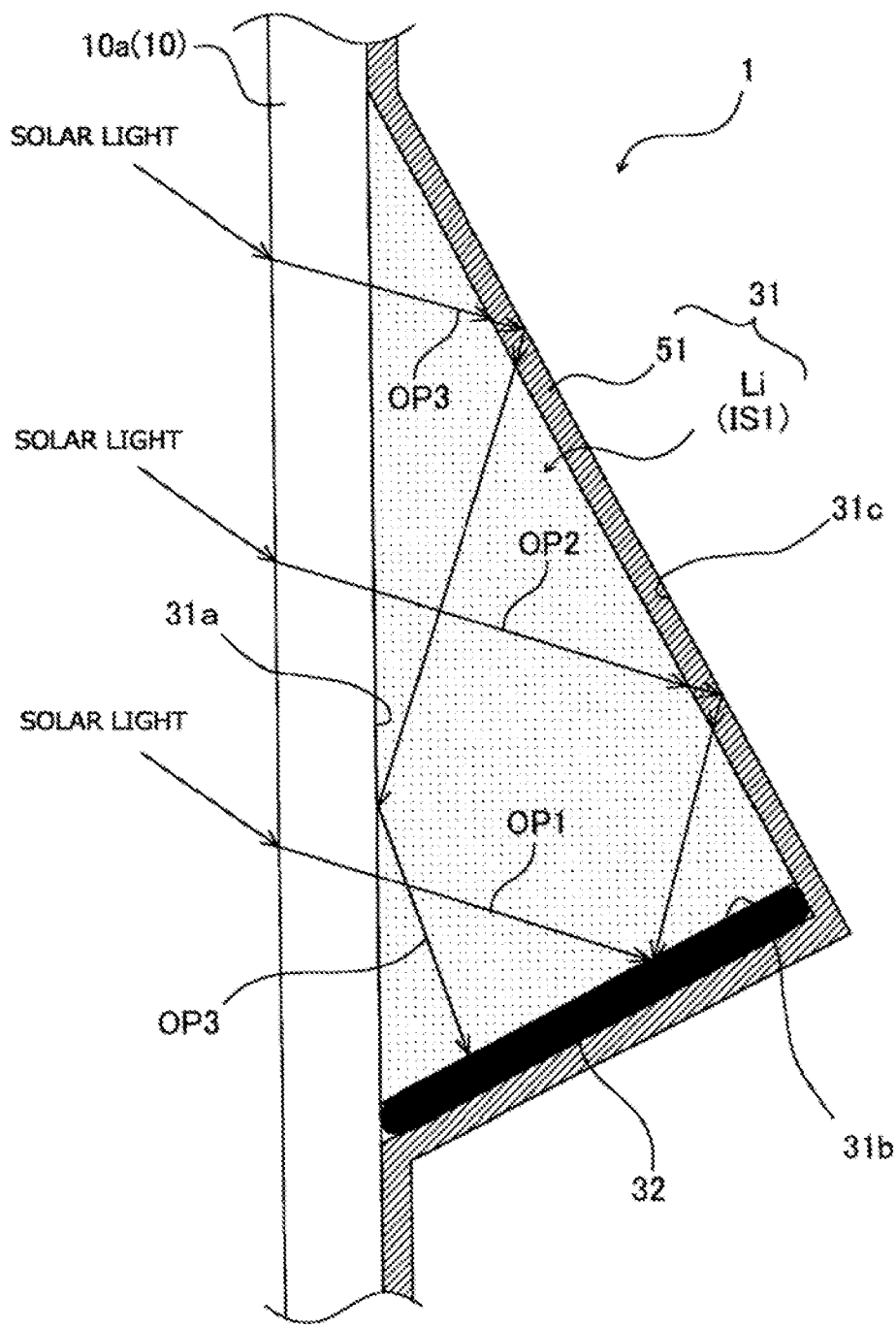
FIG. 2 is an enlarged cross-sectional view including a first triangular prism.

FIG. 2 is an enlarged cross-sectional view including the first triangular prism 31. The first triangular prism 31 is formed of a first side 31a along the two sheets of the plate material 10 in a cross-sectional view, a second side 31b and a third side 31c having an angle with respect to the first side 31a. The second side 31b is a side located vertically below the third side 31c in the pivot window 1 in an elevation surface state.

The first selective absorption part 32 is installed on the second side 31b, and receives solar heat from solar light incident through the first triangular prism 31. The first selective absorption part 32 is formed in such a manner that absorptivity is high in a solar light wavelength range (0.3 to 2.5 μm) and emissivity is reduced in an infrared wavelength range (3.0 to 20 μm). In the example illustrated in FIG. 2, the first selective absorption part 32 is housed in the first internal space IS1, but the present invention is not limited thereto. The first selective absorption part 32 may be provided outside the first internal space IS1 (outside the first wall 51).

Here, in the first triangular prism 31, a refractive index and each internal angle of the triangle are set so that the following three types of optical paths OP1 to OP3 are realized. In the first optical path OP1 of the three types of optical paths OP1 to OP3, the solar light that passes through the first plate material 10a and enters the first triangular prism 31 from the first side 31a directly reaches the second side 31b. In the second optical path OP2, the solar light is totally reflected by the third side 31c and reaches the second side 31b. In the third optical path OP3, after the solar light is totally reflected in the order of the third side 31c and the first side 31a, the solar light reaches the second side 31b.

In order to realize the above-described first to third optical paths OP1 to OP3, an incidence angle of the second optical path OP2 to the third side 31c is required to be equal to or greater than a critical angle. An incidence angle of the third optical path OP3 to the third side 31c is equal to or greater than a critical angle, and an incidence angle to the first side 31a after the total reflection is also equal to or greater than the critical angle.

In this manner, since the first triangular prism 31 is configured to realize the three types of optical paths OP1 to OP3, the first selective absorption part 32 can efficiently receive the solar heat, and thus the first triangular prism 31 can be heated. The heated triangular prism 31 discharges the humidity from the hygroscopic liquid Li.

In the first embodiment, it is assumed that both of the hygroscopic liquid Li and the first wall 51 are configured to have the same refractive index (for example, refractive index 1.41), but the present invention is not particularly limited thereto. The first triangular prism 31 is formed of the hygroscopic liquid Li and the first wall 51, but is not limited thereto. The first triangular prism 31 may include a triangular pipe capable of encapsulating the liquid Li inside, and the hygroscopic liquid Li may be encapsulated in the triangular pipe. The first triangular prism 31 may be formed of a solid substance such as porous glass.

FIG. 1 is referred to again. The second triangular prism 41 is formed of a fourth side 41a along the two sheets of the plate material 10 in a cross-sectional view, a fifth side 41b and a sixth side 41c having an angle with respect to the fourth side 41a. The fifth side 41b is a side located vertically above the sixth side 41c in the pivot window 1 in an elevation surface state.

The second unit 40 having the second triangular prism 41 and the second selective absorption part 42 as described above has a point symmetrical structure with the first unit 30 centering on a center position CP of a height and a thickness of the pivot window 1 in a cross-sectional view. Therefore, as described later, when the pivot window 1 is vertically rotated (half rotated in a vertical direction) while maintaining left and right positions thereof, the second triangular prism 41 realizes the three types of optical paths OP1 to OP3. Since the first triangular prism 31 and the second triangular prism 41 have the same shape and form a pair, an image restoration effect can be provided. That is, when a user visually recognizes a scenery from the indoor side, distortion of the scenery is configured to be suppressed. The second triangular prism 41 is also formed of the hygroscopic liquid Li and the second wall 52 in the same manner as that of the first triangular prism 31, but is not limited thereto. The second triangular prism 41 may include the triangular pipe capable of encapsulating the liquid Li inside, and the hygroscopic liquid Li may be encapsulated in the triangular pipe. The second triangular prism 41 may be formed of the solid substance such as porous glass.

The second selective absorption part 42 is installed on the fifth side 41b, and receives solar heat from the solar light incident through the second triangular prism 41 when the pivot window 1 is half rotated in the vertical direction. In the same manner as that of the first selective absorption part 32, the second selective absorption part 42 is formed in such a manner that the absorptivity is high in the solar light wavelength range (0.3 to 2.5 µm) and the emissivity is reduced in the infrared wavelength range (3.0 to 20 µm). In the example illustrated in FIG. 1, the second selective absorption part 42 is housed in the second internal space IS2, but the present invention is not limited thereto. The second selective absorption part 42 may be provided outside the second internal space IS2 (outside the second wall 52).

Here, the second triangular prism 41 becomes the indoor side in the state illustrated in FIG. 1. Since the second plate material 10b is vapor permeable, the second triangular prism 41 can take in humidity on the indoor side, thereby making it possible to provide a humidity control effect to the indoor side.

Figure 3:
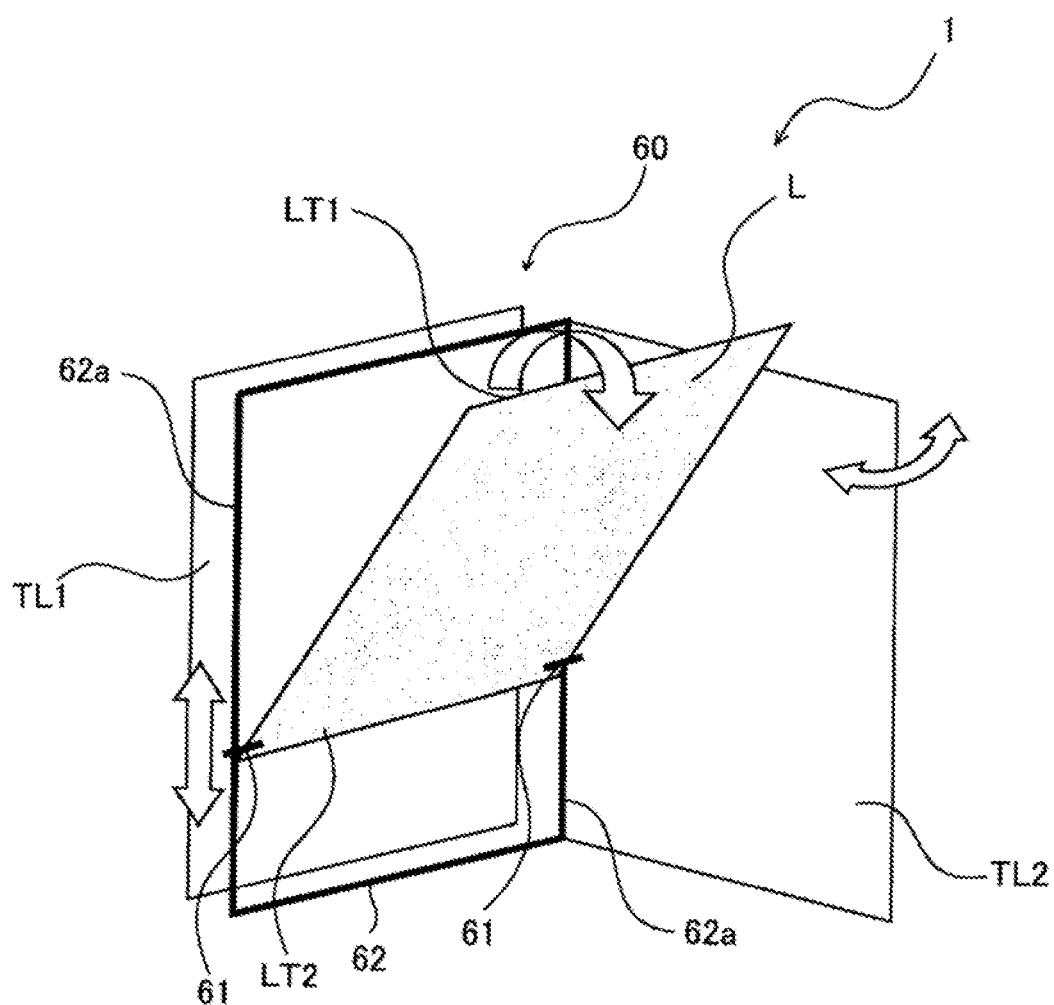
FIG. 3 is a perspective view illustrating the pivot window according to the first embodiment, and illustrates a rotation mechanism.

FIG. 3 is a perspective view illustrating the pivot window 1 according to the first embodiment, and illustrates a rotation mechanism. In the following description a configuration of the pivot window 1 excluding a rotation mechanism 60 (two sheets of the plate material 10, vacuum sealing member 20, first unit 30, second unit 40, and isolation wall 50) is referred to as a laminated body (flat plate body) L.

As illustrated in FIG. 3, the pivot window 1 includes a transparent louver TL1 also referred to as a jalousie window the outdoor side of the laminated body L. The pivot window 1 includes an indoor louver TL2 on the indoor side of the laminated body L. The pivot window 1 according to the first embodiment includes the rotation mechanism 60. The rotation mechanism 60 includes a pivot 61, a window frame 62, and a lock unit which is not illustrated, and the laminated body L can be half rotated without contacting the louvers TL1 and TL2.

More specifically, the pivot 61 is a rotary shaft member provided at any one of upper and lower end parts LT2 of the laminated body L. The above-described pivots 61 are respectively provided on the left and right sides of the laminated body L. The laminated body L is fitted to the window frame 62, and the laminated body L fitted to the window frame 62 is in a locked state in which a fitted state is maintained by the lock unit which is not illustrated. The pivot 61 is slidable with respect to left and right members 62a of the window frame 62. The indoor louver TL2 can be opened and closed in an indoor direction.

According to the above-described configuration, a rotation operation can be performed as follows. First, it is assumed that the pivot 61 is located at a lower end of the window frame 62. From this state, the indoor louver TL2 is opened. Next, the lock unit is released, and an end part LT1 of the laminated body L on the side where the pivot 61 is not provided is drawn out to the indoor side. Next, an end part LT2 of the laminated body L on the side of the pivot 61 is slid upward with respect to the window frame 62. Thereafter, when the end part LT2 of the laminated body L reaches an upper end of the window frame 62, the laminated body L is fitted to the window frame and locked by the lock unit. Finally, the indoor louver TL2 is closed.

As described above, a half rotation operation in the vertical direction is performed. When the half rotation operation in the vertical direction is performed, a vertical position is reversed while the horizontal positions of the first unit 30 and the second unit 40 are maintained.

Next, action of the pivot a window 1 according to the first embodiment will be described. First, it is assumed that the first unit 30 illustrated in FIG. 1 is directed to the outdoor side and the second unit 40 is directed to the indoor side.

In this state, the solar light reaches the first unit 30 via the first plate material 10a. Since the first triangular prism 31 of the first unit 30 realizes three types of optical paths OP1 to OP3, the first selective absorption part 32 efficiently receives the solar light and receives the solar heat. The hygroscopic liquid Li forming the first triangular prism 31 is heated by the first selective absorption part 32, thereby discharging humidity. The humidity discharged from the hygroscopic liquid Li is discharged to the outside air via the water vapor permeable first plate material 10a.

On the other hand, in the second unit 40 the hygroscopic liquid Li forming the second triangular prism 41 takes in humidity on the indoor side. That is, the humidity on the indoor side is absorbed to the hygroscopic liquid Li via the second plate material 10b having water vapor permeability. Accordingly, the humidity control effect is provided to the indoor side.

It is assumed that the laminated body L is half rotated in the vertical direction while maintaining the left and right positions by using the rotation mechanism 60 illustrated in FIG. 3. In this case, the second unit 40 is directed to the outdoor side and the first unit 30 is directed to the indoor side.

In this state, the solar light reaches the second unit 40 via the second plate material 10b. Since, the second unit 40 and the first unit 30 have a point symmetrical structure, three types of optical paths OP1 to OP3 are also realized in the second triangular prism 41 of the second unit 40. Accordingly, the second selective absorption part 42 efficiently receives the solar light and receives the solar heat. The hygroscopic liquid Li forming the second triangular prism 41 is heated by the second selective absorption part 42 thereby discharging humidity. That is, the humidity is discharged from the hygroscopic liquid Li taking in the humidity on the indoor side thereby regenerating the hygroscopic liquid Li.

On the other hand in the first unit 30 that becomes the indoor side, the hygroscopic liquid Li forming the first triangular prism 31 becomes in a regenerated state, the humidity on the indoor side is taken in. Therefore, the humidity control effect is provided to the indoor side.

In this manner, according to the pivot window 1 of the first embodiment, since the humidity control effect is provided n both of the state where the first plate material 10a is directed outdoors and the state where the second plate material 10b is directed outdoors, there is no case in which the temperature and humidity cannot be voluntarily adjusted by exerting only the heat Insulating effect when one surface becomes the outdoor side, and the humidity control effect can be provided to the indoor side even though any one of the surfaces becomes the outdoor side.

Since it is possible to perform the rotation in the vertical direction while maintaining the left and right positions, for example, when relative positions of the first plate material 10a and the second plate material 10b are switched and the vertical rotation is not performed, the humidity control effect can be provided to the indoor side by appropriately performing rotation when the humidity control effect cannot be obtained on both surfaces.

As the first unit 30, the first triangular prism 31 having the absorptivity and the first selective absorption part 32 are provided, and as the second unit 40, the second triangular prism 41 having the absorptivity and the second selective absorption part 42 are provided. Therefore, when the first unit becomes the outdoor side, in the first unit 30 on the outdoor side, the humidity is discharged from the first triangular prism 31 to be regenerated by heating using the solar heat, whereby in the second unit 40 on the outdoor side, the humidity on the indoor side is absorbed, thereby making it possible to provide the humidity control effect. When the humidity absorption is sufficiently performed by the second triangular prism 41 of the second unit 40, the second unit 40 becomes the outdoor side by performing the vertical rotation and the second triangular prism 41 on the side of the second unit 40 can be regenerated. The first unit 30 moves to the indoor side in a state of being regenerated by the vertical rotation, and the humidity on the indoor side is absorbed, thereby making it possible to provide the humidity control effect. Therefore, a continuous humidity lowering effect can be obtained.

Since both the first unit 30 and the second unit 40 include the triangular prisms 31 and 41, and the second side 31b and the fifth side 41b are disposed to face each other, the triangular prisms 31 and 41 become a pair, thereby making it possible to function as a window suppressing distortion when a user visually recognizes a scenery.

Hereinabove described is a method referred to as a temperature swing method for absorbing and desorbing humidity in the air by using a fact that an amount of water absorbed by a hygroscopic material changes depending on its temperature. In the same manner, when an adsorbent of oxygen, carbon dioxide, and a volatile organic compound (VOC) is used instead of the hygroscopic material, concentrations of oxygen and carbon dioxide and concentration of the volatile organic compound (VOC) in the room can be adjusted by the temperature swing method.

Next, a second embodiment of the present invention will be described. A pivot window according to the second embodiment has the following configuration. Hereinafter in the description of the second embodiment, the same or similar elements as those of the first embodiment will be denoted by the same reference signs.

Figure 4:
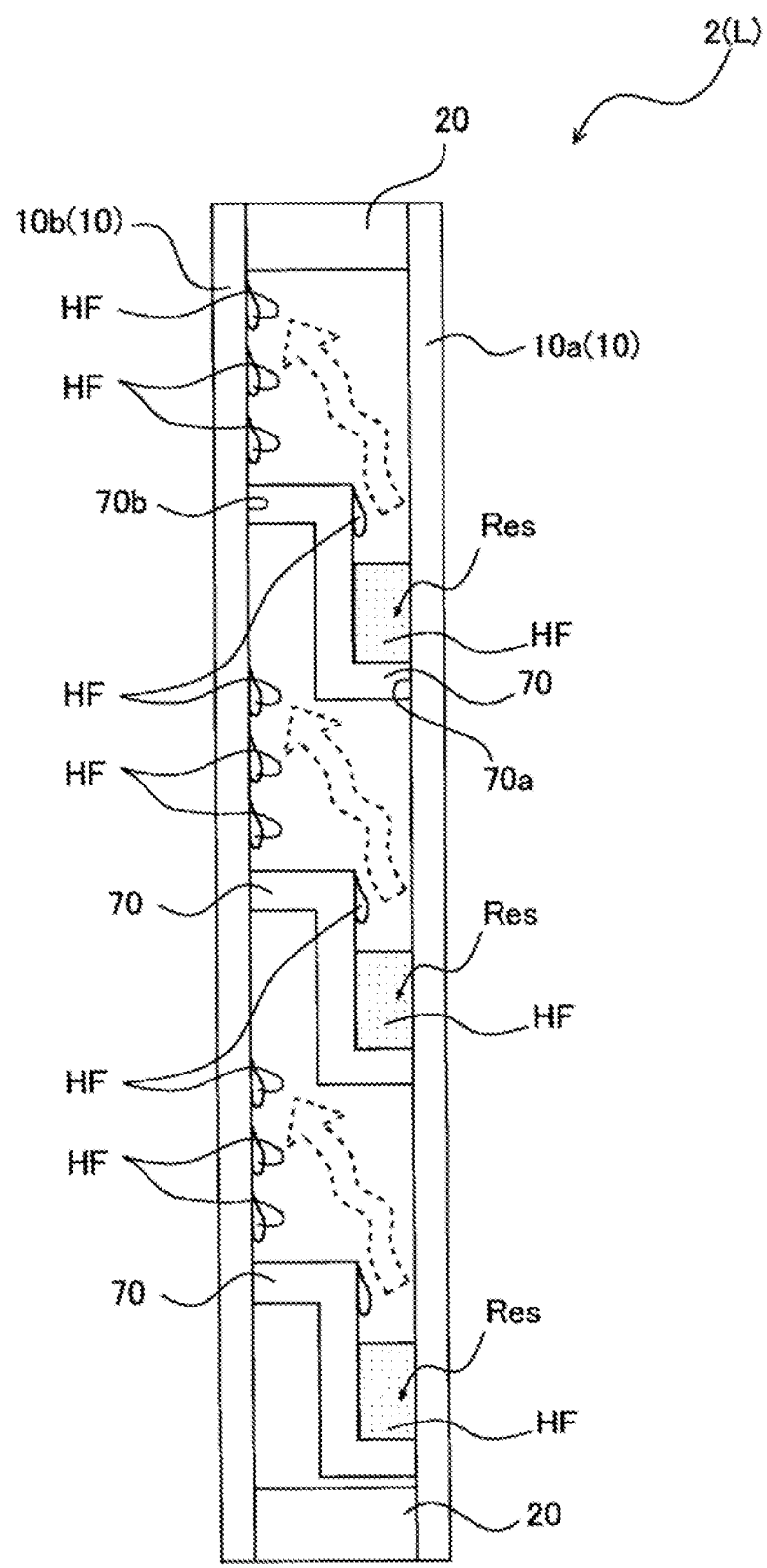
FIG. 4 is a cross-sectional view illustrating a pivot window according to a second embodiment.

FIG. 4 is a cross-sectional view illustrating a pivot window according to the second embodiment. As illustrated in FIG. 4, a pivot window 2 according to the second embodiment roughly includes the two sheets of the plate material 10, the vacuum sealing member 20, a slope 70, and a hydraulic fluid (liquid) HF.

The two sheets of the plate material 10 are transparent plate materials disposed almost in parallel with each other. These plate materials 10 are formed of, for example, a glass material. These plate materials 10 do not have the water vapor permeability, which is different from the first embodiment. In the second embodiment, an internal space formed by the two sheets of the plate material 10 and the vacuum sealing member 20 is in a vacuum state from a viewpoint of heat insulation. The internal space is not limited to the vacuum state, but may be filled with a predetermined gas.

The slope 70 is a transparent member interposed between the two sheets of the plate material 10, and is folded at 90 degrees twice in the cross-sectional view state illustrated in FIG. 4 to form a bent body having an approximately N-shaped cross section. In the slope 70, one end part 70a is provided to contact an inner wall of the first plate material 10a, and the other end part 70b is provided to contact an inner wall of the second plate material 10b. The above-described slope 70 forms a storage part Res that can store the hydraulic fluid HF together with the first plate material 10a on one end side.

Figure 5:
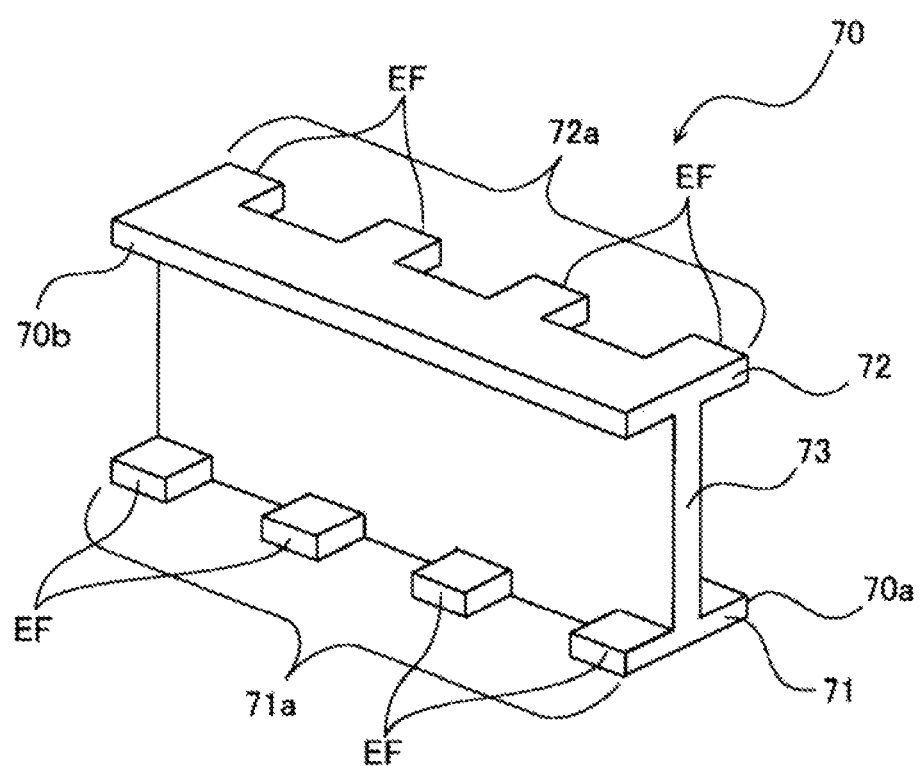
FIG. 5 is a perspective view illustrating details of a slope illustrated in FIG. 4.

FIG. 5 is a perspective view illustrating details of the slope 70 illustrated in FIG. 4. As illustrated in FIG. 5, the slope 70 includes a lower plate 71, an upper plate 72 disposed in parallel with the lower plate 71, and a connection plate 73 connecting the lower plate 71 and the upper plate 72.

The lower plate 71 has the above-described end part 70a, and the opposite side of the end part 70a is formed as a comb tooth part 71a protruding in a comb tooth shape. Each end surface EF of the comb tooth part 71a becomes a portion that contacts the inner wall of the second plate material 10b. The upper plate 72 has a point symmetrical structure with the lower plate 71 with the connection plate 73 interposed therebetween. That is, the upper plate 72 is formed as a comb tooth part 72a protruding in a comb tooth shape on the side opposite to the end part 70b, and each end surface EF of the comb tooth part 72a is a portion that contacts the inner wall of the first plate material 10a. In this manner, the opposite end parts (end part 70a and end surface EF) of the lower plate 71 of the slope 70 and the opposite end parts (end part 70b and end surface EF) of the upper plate 72 thereof respectively contact the two sheets of the plate material 10. Accordingly, the slope 70 supports the two sheets of the plate material 10 in the vacuum state from the inside thereof.

FIG. 4 is referred to again. In the embodiment, the hydraulic fluid HF is a transparent liquid such as water. The hydraulic fluid HF is not limited to water. The above-described hydraulic fluid HF is stored in the storage part Res. The hydraulic fluid HF in the storage part Res can be evaporated by heat from the first plate material 10a. The evaporated hydraulic fluid HF becomes water vapor and reaches the second plate material 10b. The hydraulic fluid HF becoming the water vapor is condensed and liquefied in the second plate material 10b. The liquefied hydraulic fluid HF flows down the inner surface of the second plate material 10b and accumulates on the upper plate 72 of the slope 70 (refer to FIG. 5). When a certain amount or more of the hydraulic fluid HF accumulates on the upper plate 72, the hydraulic fluid HF falls into the storage part Res from a gap between the comb tooth parts 72a of the upper plate 72.

Specifically, when a room temperature is 20° C. and an outside air temperature is 25° C., a vapor pressure of water (hydraulic fluid HF) stored in the storage part Res is about 2.4 kPa, and the internal space functions as a heat insulating glass in which a vacuum state of about 2.5/100 atm is provided. When the room temperature rises up to 30° C. from this state, evaporation of water progresses and the pressure of the internal space attempts to rise up to 4.3 kPa, but the evaporated water (water vapor) is cooled and liquefied when contacting the second plate material 10b on the outdoor side, and flows down the inner surface of the second plate material 10b. The water flowing down returns to the storage part Res via the upper plate 72 of the slope 70.

As described above, the hydraulic fluid HF is formed to return to the storage part Res again via the second plate material 10b from the storage part Res, and the slope 70 has a liquid circulation structure capable of performing circulation of the hydraulic fluid HF. The first plate material 10a functions as an evaporator because the hydraulic fluid HF evaporates, and the second plate material 10b functions as a condenser because the hydraulic fluid HF condenses. Therefore, the side of the first plate material 10a is cooled by being deprived of evaporation heat, and condensation heat is discarded from the side of the second plate material 10b. As a result, the heat on the side of the first plate material 10a flows through to the side of the second plate material 10b, and for example, in the summer, the indoor side becomes the first plate material 10a, thereby making it possible to obtain a temperature control effect that makes the room comfortable without taking in humidity. When the room temperature is low in the summer, the hydraulic fluid HF can function as the heat insulating glass without evaporating.

Here, in the embodiment, the slope 70 forms the storage part Res together with the first plate material 10a, but a heat transfer member may be attached to the inner surface of the first plate material 10a, and the storage part Res may be formed together with the heat transfer member. That is, the slope 70 may form the storage part Res on the side of the first plate material 10a together with other members. In the embodiment, the hydraulic fluid HF reaches the second plate material 10b and is condensed and liquefied, but the present invention is not limited thereto, and the heat transfer member may be attached to the inner surface of the second plate material 10b so that the hydraulic fluid HF may reach the heat transfer member and may be condensed and liquefied.

When the slope 70 has a liquid circulation structure that circulates the hydraulic fluid HF, the structure is not limited to the structure illustrated in FIG. 5, and for example, may be a simple inclined structure (inclined structure inclined from the end part 70a toward the end part 70b).

The first plate material 10a may be a heat absorbing glass (glass containing metal such as iron in a glass composition) for improving evaporation ability. At least one inner surface of the two sheets of the plate material 10 may be subjected to an infrared ray reflection treatment in order to improve heat insulation property during heat insulation.

Figure 6:
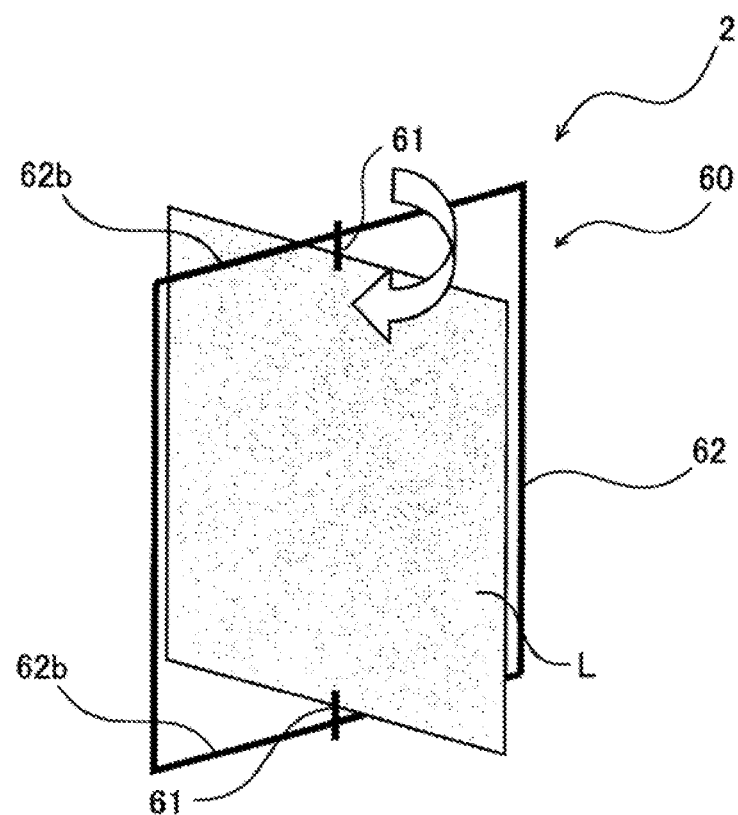
FIG. 6 is a perspective view illustrating the pivot window according to the second embodiment, and illustrates a rotation mechanism.

FIG. 6 is a perspective view illustrating the pivot window 2 according to the second embodiment, and illustrates a rotation mechanism. As illustrated in FIG. 6, the pivot window 2 includes the rotation mechanism 60 in addition to the configuration illustrated in FIG. 4. The rotation mechanism 60 includes the pivot 61, the window frame 62, and the lock unit which is not illustrated, in the same manner as that of the first embodiment.

The pivot 61 is connected to the center of the upper and lower sides of the laminated body (flat plate body) L including the two sheets of the plate material 10, the vacuum sealing member 20, and the slope 70. The pivots 61 are rotatably provided at central parts of upper and lower members 62b of the rectangular window frame 62, respectively. Therefore, the laminated body L is rotatable centering on the pivot 61, and is half rotated in the horizontal direction while maintaining the vertical position of the laminated body L at the time of the rotation, whereby the relative positions of the first plate material 10a and the second plate material 10b can be switched.

The laminated body L is locked to the window frame 62 by the lock unit after the half rotation is performed. Accordingly, it is possible to obtain the pivot inflow 2 in which a heat-flow direction is reversed. That is, a cooling effect and a heating effect in the room can be switched by allowing the laminated body L to perform the half rotation.

Figure 7:
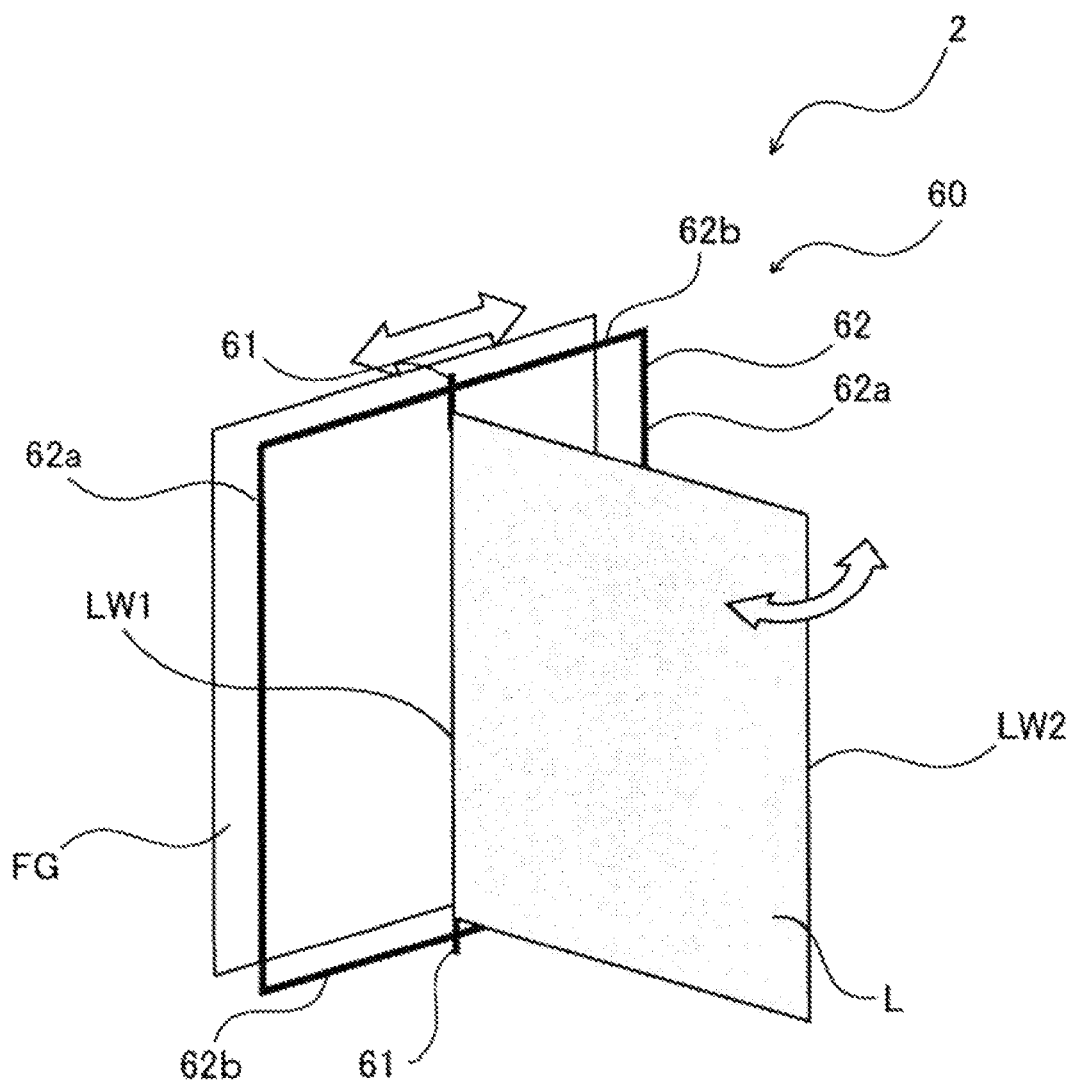
FIG. 7 is a perspective view illustrating another example of the pivot window according to the second embodiment.

The configuration in which the laminated body L is half rotated is not limited to that illustrated in FIG. 6. FIG. 7 is a perspective view illustrating another example of the pivot window 2 according to the second embodiment. As illustrated in FIG. 7, the pivot window 2 further includes a fixed glass FG on the outdoor side. Therefore, the pivot window 2 illustrated in FIG. 7 is configured to be able to perform the half rotation without causing the laminated body L to contact the fixed glass FG.

In the example illustrated in FIG. 7, the pivot 61 is provided at either left or right end part LW1 of the laminated body L, and the pivot 61 is slidable with respect to the upper and lower members 62b of the window frame 62. Therefore, the rotation operation can be performed as follows. First, it is assumed that the end part LW1 of the laminated body L on the side of the pivot 61 is located on one of the left and right members 62a of the window frame 62. When the laminated body L is half rotated from this state, the lock unit is first released. Next, an end part LW2 of the laminated body L on the side where the pivot 61 is not provided is drawn out to the indoor side. Next, the end part LW1 of the laminated body L on the side of the pivot 61 is slid to the other side of the left and right members 62a of the window frame 62. Thereafter, the laminated body L is fitted into the window frame 62 and is locked by the lock unit so that the end part LW2 of the laminated body L becomes one side of the left and right members 62a.

As described above, even in the case of the pivot window 2 including the fixed glass FG on the outdoor side, the heat-flow direction can be reversed, and cooling and heating in the room can be switched.

Next, an operation of the pivot window 2 according to the embodiment be described. First, as illustrated in FIG. 4, it is assumed that the first plate material 10a becomes the indoor side and the second plate material 10b becomes the outdoor side. In this case, when the room temperature is 20° C. and the outside air temperature is 25° C., the hydraulic fluid HF in the storage part Res does not evaporate. Meanwhile, since the internal space of the do sheets of the plate material 10 is in the vacuum state, the heat insulating effect is performed, and the pivot window 2 functions as the heat insulating glass.

On the other hand, for example, when the room temperature is 30° C. and the outside air temperature becomes 25° C., the hydraulic fluid HF in the storage part Res evaporates. The evaporated hydraulic fluid HF reaches the second plate material 10b on the outdoor side, is cooled and liquefied, and flows down the inner surface of the second plate material 10b. The hydraulic fluid HF flowing down returns to the storage part Res again via the upper plate 72 of the slope 70. In this process, the first plate material 10a is cooled by the evaporation heat due to the evaporation of the hydraulic fluid HF, and the condensation heat of the hydraulic fluid HF is discarded from the second plate material 10b. Therefore, the heat on the indoor side is caused to flow to the outside of the room, thereby making it possible to obtain a temperature control effect of cooling the room.

As illustrated in FIG. 6 or FIG. 7, when the relative positions of the first plate material 10a and the second plate material 10b are switched while maintaining the vertical positions thereof, the operation is reversed to the above-described operation.

That is, when the outside air temperature becomes equal to or higher than a predetermined temperature in the winter, the hydraulic fluid HF in the storage part Res evaporates. Accordingly, in the same manner as described above, the first plate material 10a that becomes the outdoor side is cooled by the evaporation heat due to the evaporation of the hydraulic fluid HF, and the condensation heat of the hydraulic fluid HF is discarded from the second plate material 10b that becomes the indoor side. Therefore, the heat on the outdoor side is caused to flow through the room, thereby making it possible to obtain a temperature control effect of heating the room.

The pivot window 2 functions as the heat insulating glass in the same manner as described above in an environment in which the hydraulic fluid HF in the storage part Res does not evaporate in the winter.

As described above, according to the pivot window 2 of the second embodiment, in the same manner as that of the first embodiment, the temperature control effect can be provided to the indoor side even though any one of the surfaces becomes the outdoor side.

The temperature control effect to be provided is configured to be different depending on which of the first plate material 10a and the second plate material 10b becomes the outdoor side. Therefore, the surface that becomes the outdoor side is selected according to the environment, thereby making it possible to obtain the temperature control effect (air conditioning effect) according to the environment.

Since the heat insulating effect can be obtained when a temperature condition for evaporating the hydraulic fluid HF is not satisfied, the heat insulating effect can be obtained when the air conditioning effect cannot be obtained.

Since it is possible to perform the rotation in the horizontal direction while maintaining the vertical position, for example, the air conditioning effect can be provided to the indoor side by appropriately performing the rotation when it is desirable to perform the rotation while maintaining the vertical direction.

Provided is the slope 70 having the liquid circulation structure in which the hydraulic fluid HF in the storage part Res evaporated by the heat on the side of the first plate material 10a reaches the side of the second plate material 10b, and the condensed liquid on the side of the second plate material 10b returns to the storage part Res again. Therefore, in an environment in which the liquid evaporates by the heat from the side of the first plate material 10a, the side of the first plate material 10a is cooled by being deprived of the evaporation heat. On the other hand, when the evaporated hydraulic fluid HF reaches the side of the second plate material 10b, the evaporated hydraulic fluid HF is cooled to be condensed and liquefied, and the condensation heat is discarded from the side of the second plate material 10b. Therefore, as a result, the heat on the side of the first plate material 10a flows through to the side of the second plate material 10b, and the cooling effect and the heating effect can be provided to the indoor side by selecting which surface is directed to the indoor side.

Next, a third embodiment of the present invention will be described. A pivot window according to the third embodiment has the following configuration. Hereinafter, in the description of the third embodiment, the same or similar elements as those of the second embodiment will be denoted by the same reference signs.

Figure 8:
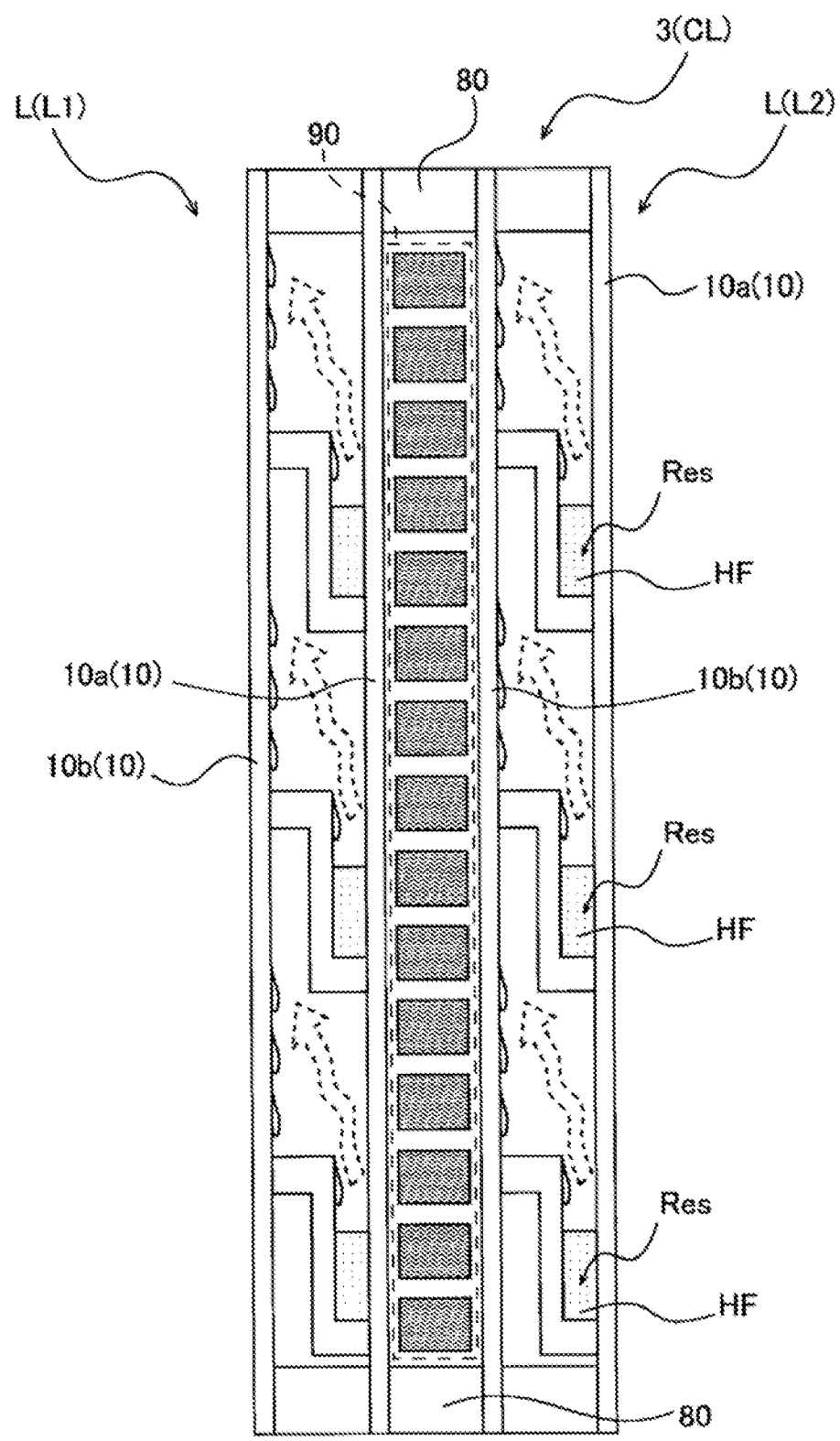
FIG. 8 is a cross-sectional view illustrating a pivot window according to a third embodiment.

FIG. 8 is a cross-sectional view illustrating a pivot window according to the third embodiment. As illustrated in FIG. 8, a pivot window 3 according to the third embodiment includes two laminated bodies L according to the second embodiment (one example of a plurality). These two laminated bodies L are disposed to face each other in a state of having a space.

In the third embodiment, a sealing member 80 is provided between the two laminated bodies L, and a transparent latent heat storage material 90 is provided in a space sandwiched between the two laminated bodies L and the sealing member 80. The latent heat storage material 90 is formed of, for example, inorganic salt hydrate ($Na_2SO_410H_2O$ and $CaCl_26H_2O$). The above-described latent heat storage material 90 is encapsulated and held in a cavity portion of a ladder-shaped cross-section material (plate material in which the cavity portions serving as the cells S are arranged in the vertical direction). The latent heat storage material 90 may be encapsulated in a cavity portion of a honeycomb cross-section material (plate material in which the cavity portions serving as the cells S are arranged vertically and horizontally in a honeycomb shape). In the embodiment, for example, the latent heat storage material 90 has a melting point and a freezing point at 21° C.

The latent heat storage material 90 is not limited to the inorganic salt hydrate, but may be another material. The melting point and freezing point of the latent heat storage material 90 are not limited to 21° C. and may be other temperatures. A material having a different melting point and freezing point may be used in the latent heat storage material 90. That is, the latent heat storage material 90 may be any material as long as the material has a melting point and a freezing point in a specific temperature range according to the environment in which the pivot window 3 is used. In the embodiment, the first plate material 10a of one laminated body L1 and the second plate material 10b of the other laminated body L2 are disposed so as to face each other.

In the above-described pivot window 3, the hydraulic fluid HF evaporates at a temperature of, for example 21° C. or higher in the first plate material 10a of the other laminated body L, and the condensation heat is discarded from the side of the second plate material 10b. This heat is stored by the latent heat storage material 90. When the temperature of the side of the second plate material 10b of one laminated body L1 becomes lower than 21° C., the hydraulic fluid HF evaporates in the storage part Res on the side of one laminated body L1 by the heat stored in the latent heat storage material 90, and the condensation heat is discarded from the side of the second plate material 10b. As a result, the heat on the side of the other laminated body L2 flows through to the side of one laminated body L1 via the latent heat storage material 90 serving as a buffer. Accordingly, for example, in the summer, the indoor side becomes the other laminated body L2, thereby making it possible to obtain the temperature control effect of cooling the room without taking in humidity.

Particularly, when the room temperature is, for example, 21° C. or higher even though the outside air temperature is higher, the pivot window 3 according to the third embodiment can obtain the cooling effect by using the latent heat storage material 90. That is, since the latent heat storage material 90 is fixed at 21° C., the heat in the room can be transferred to the latent heat storage material 90, and the cooling effect in the room can be obtained when the room temperature is 21° C. or higher. The heat stored in the latent heat storage material 90 is discarded, for example, when the outside air temperature at night becomes 21° C. or lower. Therefore, the pivot window 3 is provided with the latent heat storage material 90 as the buffer, thereby making it possible to increase the frequency of performing indoor comfort.

The pivot window 3 according to the third embodiment includes the rotation mechanism 60 as illustrated in FIGS. 6 and 7, and can perform the rotation operation in which the rotation is performed in the horizontal direction while the vertical position is maintained, and the relative positions of one laminated body L1 and the other laminated body L2 can be switched.

Figure 9:
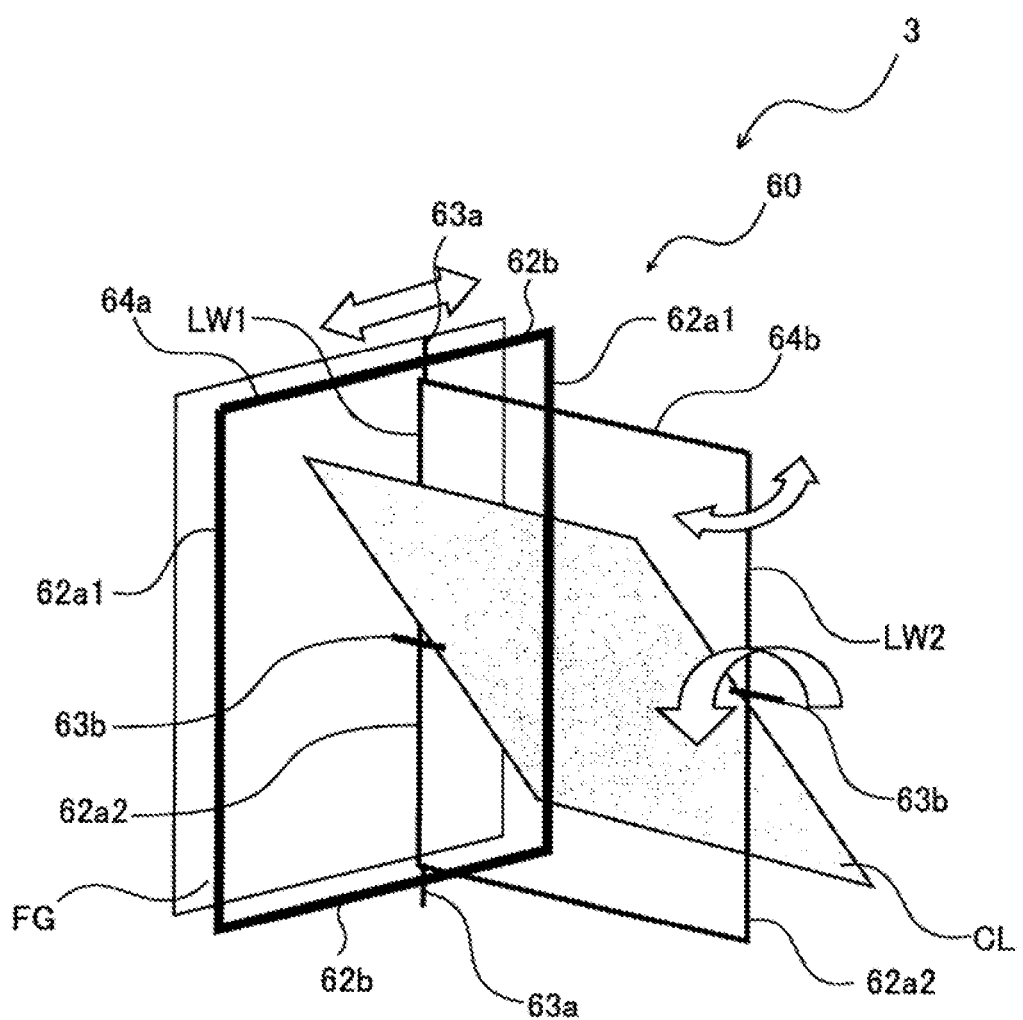
FIG. 9 is a perspective view illustrating the pivot window according to the third embodiment, and illustrates a rotation mechanism.

The pivot window 3 according to the third embodiment desirably includes a rotation mechanism illustrated in FIG. 9. FIG. 9 is a perspective view illustrating the pivot window 3 according to the third embodiment, and illustrates a rotation mechanism. In the example illustrated in FIG. 9, a configuration of the pivot window 3 excluding the rotation mechanism 60 (two laminated bodies L, sealing member 80, and latent heat storage material 90) is referred to as a composite laminated body (flat plate body) CL.

As illustrated in FIG. 9, the pivot window 3 according to the third embodiment further includes the fixed glass FG on the outdoor side. Therefore, the pivot window 3 illustrated in FIG. 9 is configured to be able to perform the half rotation in the vertical direction and the horizontal direction without causing the composite laminated body CL to contact the fixed glass FG.

In the example illustrated in FIG. 9, the rotation mechanism 60 includes a first pivot 63a, a second pivot 63b, a first window frame 64a, a second window frame 64b, and first and second lock units which are not illustrated.

The first window frame 64a is a rectangular frame fixed to the building side. The second window frame 64b includes the first pivot 63a provided at any one of left and right end parts LW1, and the first pivot 63a is slidable with respect to the upper and lower members 62b of the first window frame 64a. The second pivot 63b is attached to an intermediate part in the height direction of the composite laminated body CL, and is rotatably provided at a central part of left and right members 62a2 of the rectangular second window frame 64b.

Therefore, the rotation operation can be performed as follows. First, it is assumed that the end part LW1 on the side of the first pivot 63a of the second window frame 64b is located on one of left and right members 62a1 of the first window frame 64a. From this state, the first lock unit is released, and an end part LT2 of the second window frame 64b on the side where the first pivot 63a is not provided is drawn out to the indoor side. Next, the second lock unit is released, and the composite laminated body CL is half rotated in the vertical direction centering on the second pivot 63b. Next, the composite laminated body CL is locked by the second lock unit. Next, the end part LW1 on the side of the first pivot 63a of the second window frame 64b is slid to the other side of the left and right members 62a1 of the first window frame 64a. Thereafter, the second window frame 64b is fitted into the first window frame 64a and is locked by the first lock unit so that the end part LT2 of the second window frame 64b becomes one side of the left and right members 62a.

As described above, in the pivot window 3 including the fixed glass FG on the outdoor side, the composite laminated body CL is rotatable in both vertical and horizontal directions.

As illustrated in FIG. 5, in the slope 70, since the shapes of the lower plate 71 and the upper plate 72 have the point symmetrical structure with the connection plate 73 interposed therebetween, the slope 70 forms the storage part Res even when the composite laminated body CL is half rotated in the vertical direction. That is, when the composite laminated body CL is half rotated in the vertical direction, the storage part Res is formed by the upper plate 72 and the second plate material 10b.

Here, the latent heat storage material 90 tends to generate a precipitate by repeating solidification and melting, which causes deterioration in a heat storage amount. However, as illustrated in FIG. 9, since the pivot window 3 according to the third embodiment includes the rotation mechanism 60 that can rotate not only in the horizontal direction but also in the vertical direction, the precipitate can be crushed during the half rotation in the vertical direction, thereby making it possible to recover the heat storage amount. From a viewpoint of crushing the precipitate, the rotation may be performed once or more in the vertical direction.

Next, an operation of the pivot window 3 according to the third embodiment will be described. First, as illustrated in FIG. 8, it is assumed that the first plate material 10a of the other laminated body L2 becomes the indoor side, and the second plate material 10b of one laminated body becomes the outdoor side.

In this case, for example, when the room temperature becomes equal to or higher than 21° C., the hydraulic fluid HF in the storage part Res evaporates. The evaporated hydraulic fluid HF reaches the second plate material 10b on the outdoor side to be liquefied and flows down the inner surface of the second plate material 10b. The hydraulic fluid HF flowing down returns to the storage part Res again via the upper plate 72 of the slope 70. In this process, the first plate material 10a is cooled by the evaporation heat generated by the evaporation of the hydraulic fluid HF, and the condensation heat of the hydraulic fluid HF is discarded from the second plate material 10b. The discarded heat is stored by the latent heat storage material 90. Accordingly, the heat on the indoor side can be transferred to the latent heat storage material 90, thereby making it possible to provide an air conditioning effect of cooling the room.

With respect to the first laminated body L1, when the outside air temperature is equal to or lower than 21° C., the hydraulic fluid HF repeats the evaporation and the condensation in the same manner as described above, such that the heat stored in the latent heat storage material 90 is discarded to the outside air.

When the rotation mechanism 60 as illustrated in FIG. 9 is used to perform the rotation in the horizontal direction, and it is possible to obtain the air conditioning effect of heating the room in the winter by reversing the above-described operation. When the rotation mechanism 60 is used to perform the rotation in the vertical direction, the effect of crushing the precipitate of the latent heat storage material 90 is obtained, thereby recovering the heat storage amount. When the rotation is performed in the vertical direction and the horizontal direction, it is possible to obtain the air conditioning effect in which the operation is reversed while crushing the precipitate.

As described above, according to the pivot window 3 of the third embodiment, in the same manner as that of the first embodiment, the temperature control effect can be provided to the indoor side even though any one of the surfaces becomes the outdoor side.

The temperature control effect to be provided is configured to be different depending on which of the first laminated body L1 and the second laminated body L2 becomes the outdoor side. Therefore, the surface that becomes the outdoor side is selected according to the environment, thereby making it possible to obtain the temperature control effect (air conditioning effect) according to the environment.

Since the heat insulating effect is obtained when the temperature condition for evaporating the hydraulic fluid HF is not satisfied, the heat insulating effect can be obtained when the air conditioning effect cannot be obtained.

Since it is possible to perform the rotation in both vertical direction and horizontal direction, for example, it is possible to turn over the top and bottom while maintaining the same surface directivity as that before rotation, and vertical inversion can be performed while the same surface is directed to the outdoor side.

Since the latent heat storage material 90 having the melting point and the freezing point in the specific temperature range is provided in the space between the first and second laminated bodies L1 and L2, for example, even when the outside air temperature is higher than the room temperature, the heat in the room is transferred to the latent heat storage material 90 when the room temperature equal to or higher than the specific temperature range, and it is possible to discard the heat of the latent heat storage material 90 to the outside air when the outside becomes cooler than the specific temperature range at night. In this manner, the latent heat storage material 90 is provided as the buffer, thereby making it possible to increase the frequency of performing the indoor comfort. Particularly, when the rotation is performed in the horizontal direction while maintaining the vertical position, the relative positions of the laminated bodies L1 and L2 can be switched when it is desired to change the heat-flow direction such as in the summer and winter, and in the daytime and night, thereby making it possible to select cooling and heating. When the rotation is performed in the vertical direction while maintaining the left and right positions thereof, the latent heat storage material 90 is vertically rotated, thereby making it possible to suppress deterioration in a heat storage effect due to the precipitation of a specific component. When both rotations are performed, possible to suppress the deterioration in the heat storage effect due to the precipitation of the specific component while changing the cooling and the heating.

Next, a fourth embodiment of the present invention will be described. A pivot window according to the fourth embodiment has the following configuration. Hereinafter, in the description of the fourth embodiment, the same similar elements as those of the first embodiment will be denoted by the same reference signs.

Figure 10:
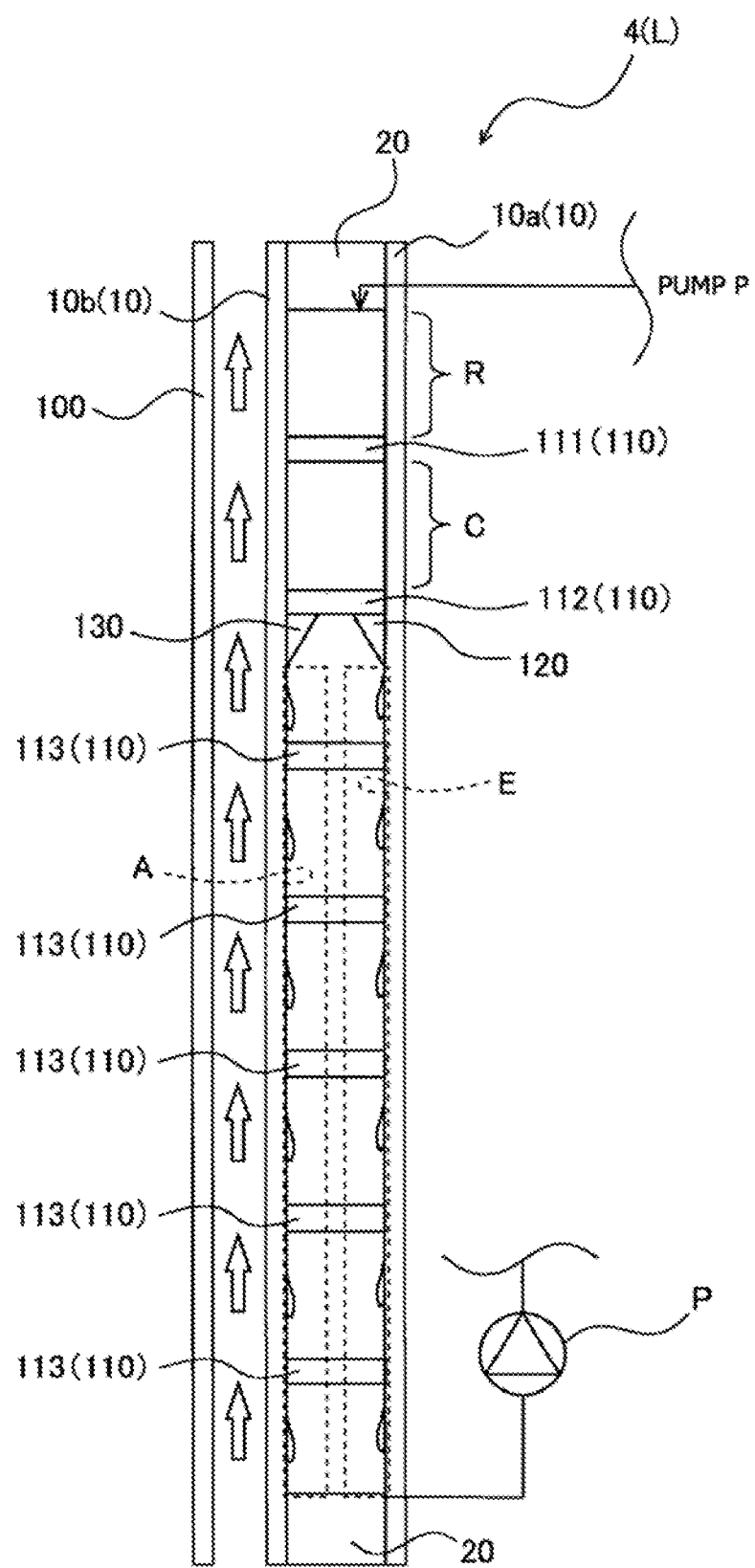
FIG. 10 is a cross-sectional view illustrating a pivot window according to a fourth embodiment.

FIG. 10 is a cross-sectional view illustrating a pivot window according to the fourth embodiment. As illustrated in FIG. 10, a pivot window 4 according to the fourth embodiment includes the two sheets of the plate material 10, the vacuum sealing member 20, a solar heat receiving part 100, a plurality of interposing members 110, a refrigerant distributor 120, an absorbing liquid distributor 130, and a pump P.

The two sheets of the plate material 10 are transparent plate materials disposed almost in parallel with each other. These plate materials 10 are formed of, for example, a glass material. These plate materials 10 do not have water vapor permeability, which is different from the first embodiment. The vacuum sealing member 20 is provided at the peripheral end parts of the two sheets of the plate material 10.

The solar heat receiving part 100 is an energy collection panel that is provided on the outdoor side of the two sheets of the plate material 10 and that is provided almost in parallel with the plate material 10. The solar heat receiving part 100 is also formed of a transparent plate material.

The plurality of interposing members 110 are provided in an internal space formed by the two sheets of the plate material 10 and the vacuum sealing member 20, and include a first interposing member 111, a second interposing member 112, and a plurality of third interposing members 113.

The first interposing member 111 is provided on the upper side between the two sheets of the plate material 10. In the fourth embodiment, a space sandwiched between the upper vacuum sealing member 20 and the first interposing member 111 is configured to function as a regenerator R that heats a dilute solution in which an absorbing liquid (for example, a lithium bromide aqueous solution) and a refrigerant (for example, water) are mixed by the heat received by the solar heat receiving part 100. The regenerator R causes the refrigerant from the dilute solution to evaporate and separates the dilute solution into a refrigerant vapor and a concentrated solution by the above-described heating.

The second interposing member 112 is provided below the first interposing member 111 between the two sheets of the plate material 10. In the fourth embodiment, a space sandwiched between the first interposing member 111 and the second interposing member 112 functions as a condenser C that liquefies the vapor refrigerant generated by the regenerator R. It is desirable that the condensation heat is discharged to the outdoor side via the side of the first plate material 10a.

The plurality of third interposing members 113 are provided on the lower side of the second interposing member 112 at almost equal intervals between the two sheets of the plate material 10. In the fourth embodiment, a space sandwiched between the second interposing member 112 and the lower vacuum sealing member 20 (lower space of the condenser C) is in a reduced pressure state. That is, the plurality of third interposing members 113 function as members for supporting the two sheets of the plate material 10 from the inside so as to withstand the reduced pressure state.

The lower space of the condenser C functions as an evaporator E and an absorber A. More specifically the refrigerant distributor 120 that drops a liquid refrigerant obtained by the condenser C onto an inner wall of the first plate material 10a is provided on the side of the first plate material 10a of the lower space. The liquid refrigerant is dropped by the refrigerant distributor 120, whereby the liquid refrigerant evaporates on the side of the first plate material 10a to become the vapor refrigerant. Accordingly, the side of the first plate material 10a of the lower space functions the evaporator E for cooling the side of the first plate material 10a.

The absorbing liquid distributor 130 that drops a concentrated solution obtained by the regenerator R onto an inner wall of the second plate material 10b is provided on the side of the second plate material 10b of the lower space. The concentrated solution is dropped by the absorbing liquid distributor 130, whereby the concentrated solution absorbs the vapor refrigerant from the evaporator E. Accordingly, the side of the second plate material 10b of the lower space functions as the absorber A for heating the second plate material 10b by absorbing heat.

The pump P serves as a power source for feeding the dilute solution absorbing the vapor refrigerant up to the regenerator R.

In the fourth embodiment, for example, the rotation mechanism 60 illustrated in FIG. 7 is provided, and the laminated body L can be half rotated in the horizontal direction while maintaining the vertical direction. A configuration of the pivot window 4 according to the fourth embodiment excluding the solar heat receiving part 100 corresponding to the FG and the rotation mechanism 60 (two sheets of the plate material 10, vacuum sealing member 20, plurality of interposing members 110, refrigerant distributor 120, and absorbing liquid distributor 130) is referred to as the laminated body (flat plate body) L.

Next, an operation of the pivot window 4 according to the fourth embodiment will be described. First, as illustrated in FIG. 10, it is assumed that the first plate material 10*a* becomes the indoor side and the second plate material 10*b* becomes the outdoor side.

In this case, the solar heat receiving part 100 receives the solar heat. The regenerator R uses the heat received by the solar heat receiving part 100, thereby causing the refrigerant from the dilute solution to evaporate and separating the evaporated refrigerant into the refrigerant vapor and the concentrated solution. The concentrated solution is introduced into the absorbing liquid distributor 130, and the refrigerant vapor is introduced into the condenser C.

The condenser C uses the air heat outside the two sheets of the plate material 10 to condense and liquefy the vapor refrigerant. The liquefied refrigerant is introduced into the refrigerant distributor 120. The refrigerant distributor 120 drops the liquid refrigerant obtained by the condenser C onto the inner wall of the first plate material 10*a* of the two sheets of the plate material. Accordingly, the refrigerant evaporates on the side of the first plate material 10*a* and cools the side of the first plate material 10*a*. Therefore, the temperature control effect of cooling the room can be obtained.

The absorbing liquid distributor 130 drops the concentrated solution obtained by the regenerator R onto the inner wall of the second plate material 10*b* of the two sheets of the plate material 10. Accordingly, the vapor refrigerant from the condenser C is absorbed to the concentrated solution and becomes the diluted solution. The absorbing heat at this time is discharged to the outside of the room via the second plate material 10*b*. Thereafter, the dilute solution is forcibly fed to the regenerator R by the pump P.

Figure 11:
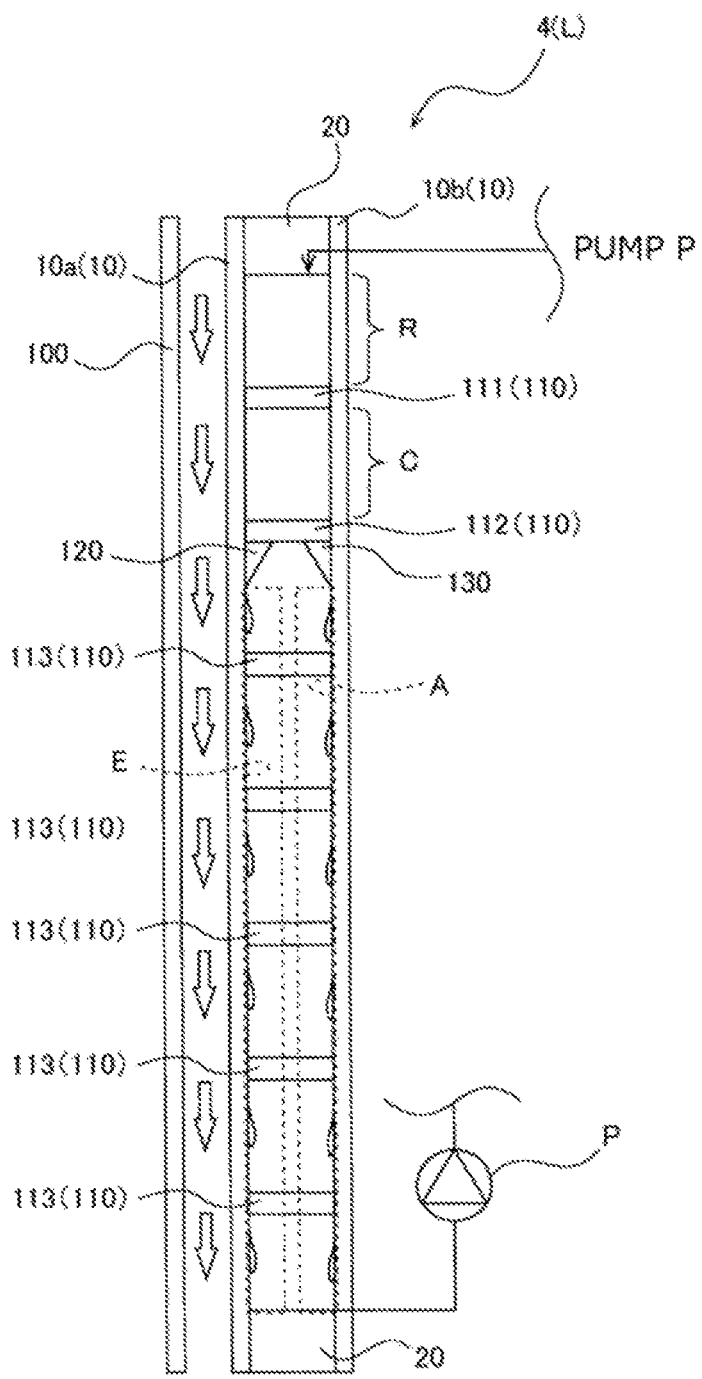
FIG. 11 is a cross-sectional view when a laminated body of the pivot window according to the fourth embodiment is rotated by using the rotation mechanism.

FIG. 11 is a cross-sectional view when the laminated body L of the pivot window 3 according to the fourth embodiment is rotated by using the rotation mechanism 60. When the relative positions of the first plate material 10*a* and the second plate material 10*b* are switched while maintaining the vertical positions thereof by using the rotation mechanism 60 as illustrated in FIG. 7, the first plate material 10*a* becomes the outdoor side and the second plate material 10*b* becomes the indoor side as illustrated in FIG. 11. In this case, the concentrated solution absorbs the vapor refrigerant obtained by the condenser C, and the absorbing heat at that time heats the second plate material 10*b*, thereby making it possible to provide the temperature control effect of heating the room. On the other hand, the refrigerant is used as the vapor refrigerant on the side of the first plate material 10*a* and cools the side of the first plate material 10*a*. This cold heat is discharged to the outside of the room via the first plate material 10*a*.

As described above, according to the pivot window 4 according to the fourth embodiment, in the same manner as that of the first embodiment the temperature control effect can be provided to the indoor side even though any one of the surfaces becomes the outdoor side.

The temperature control effect to be provided is configured to be different depending on which of the first plate material 10*a* and the second plate material 10*b* becomes the outdoor side. Therefore, the surface that becomes the outdoor side is selected according to the environment, thereby making it possible to obtain the temperature control effect (air conditioning effect) according to the environment.

Since it is possible to perform the rotation in the horizontal direction while maintaining the vertical direction, for example, the air conditioning effect can be provided to the indoor side by appropriately performing the rotation, when the rotation that maintains the vertical direction is not performed and thus the air conditioning effect is hindered.

Since the side of the first plate material 10*a* of the two sheets of the plate material 10 is used as the evaporator E and the side of the second plate material 10*b* thereof is used as the absorber A, the side of the first plate material 10*a* is cooled and the side of the second plate material 10*b* is heated. Therefore, the cooling effect and the heating effect can be provided to the indoor side by selecting which surface is directed to the indoor side.

Next, a fifth embodiment of the present invention will be described. A pivot window according to the fifth embodiment has the following configuration. Hereinafter, in the description of the fifth embodiment, the same or similar elements as those of the first embodiment will be denoted by the reference signs.

Figure 12:
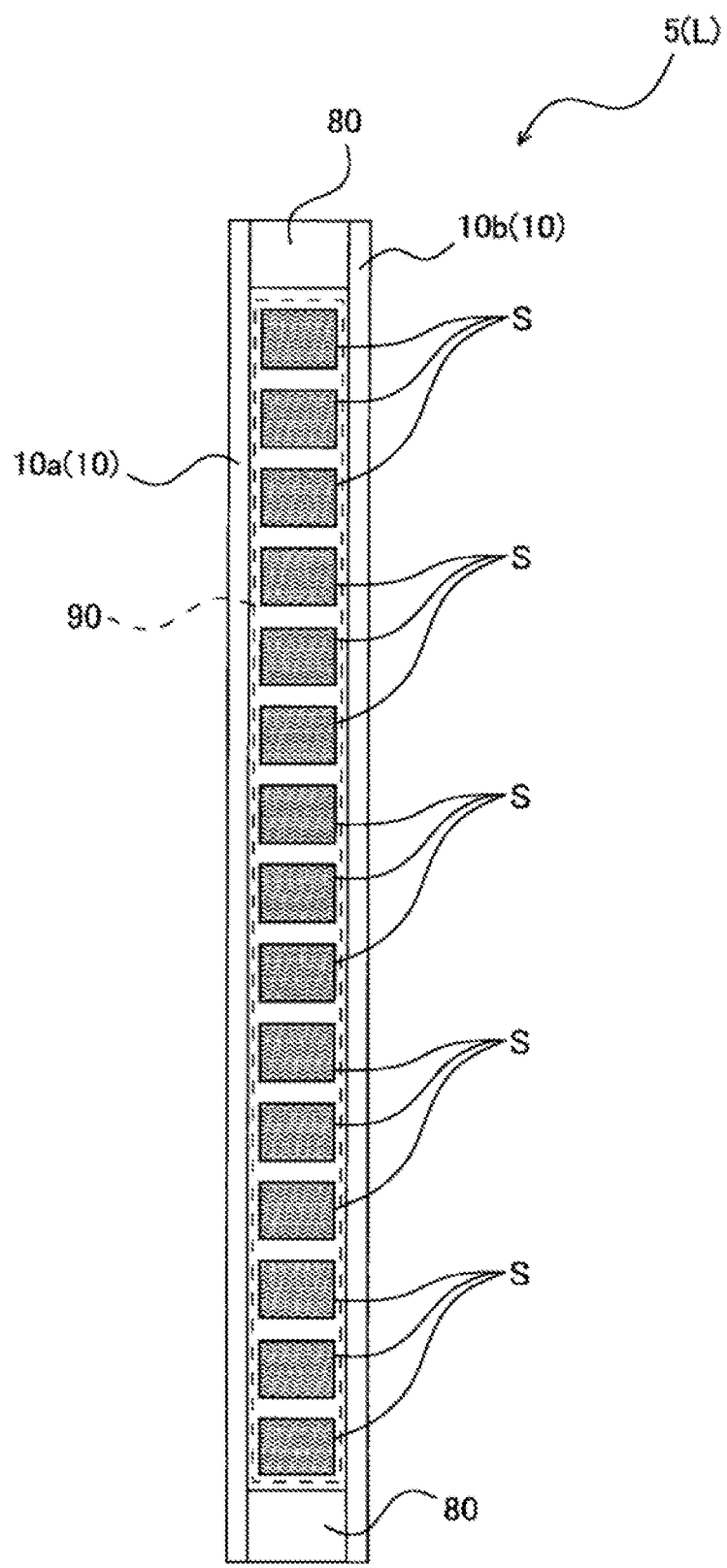
FIG. 12 is a cross-sectional view illustrating a pivot window according to a fifth embodiment.

FIG. 12 is a cross-sectional view illustrating a pivot window according to the fifth embodiment. As illustrated in FIG. 12, a pivot window 5 according to the fifth embodiment includes the two sheets of the plate material 10, the sealing member 80, and the latent heat storage material 90.

The latent heat storage material 90 is formed of, for example, the inorganic salt hydrate ($Na_2SO_4 10H_2O$ and $CaCl_2 6H_2O$), and is encapsulated and held in a cavity portion of a ladder-shaped cross-section material (plate material in which the cavity portions serving as the cells S are arranged in the vertical direction). The latent heat storage material 90 may be encapsulated in a cavity portion of a honeycomb cross-section material. Each of the plurality of cells S includes a membrane member.

Figure 13A:
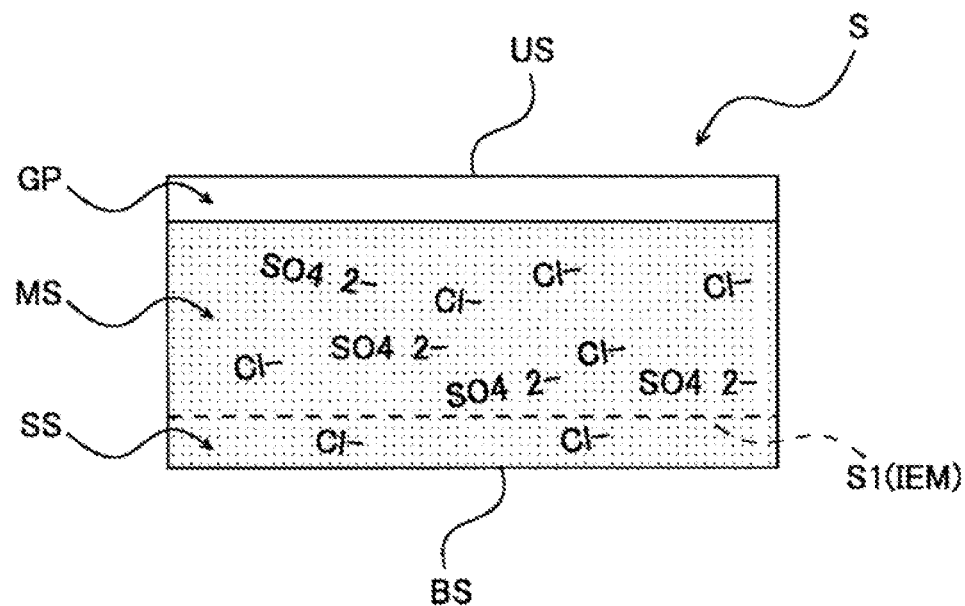
Figure 13B:
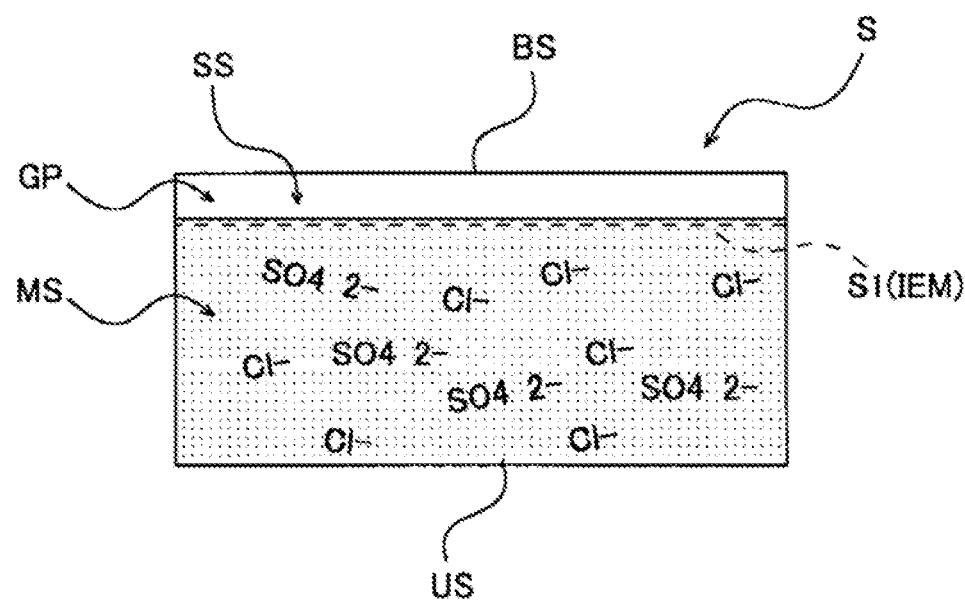
Figure 14A:
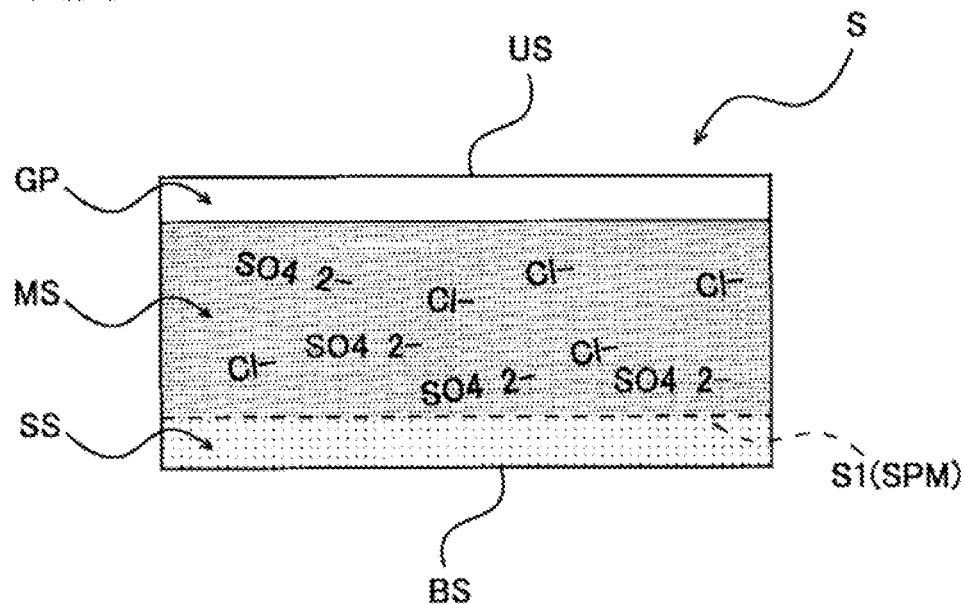
Figure 14B:
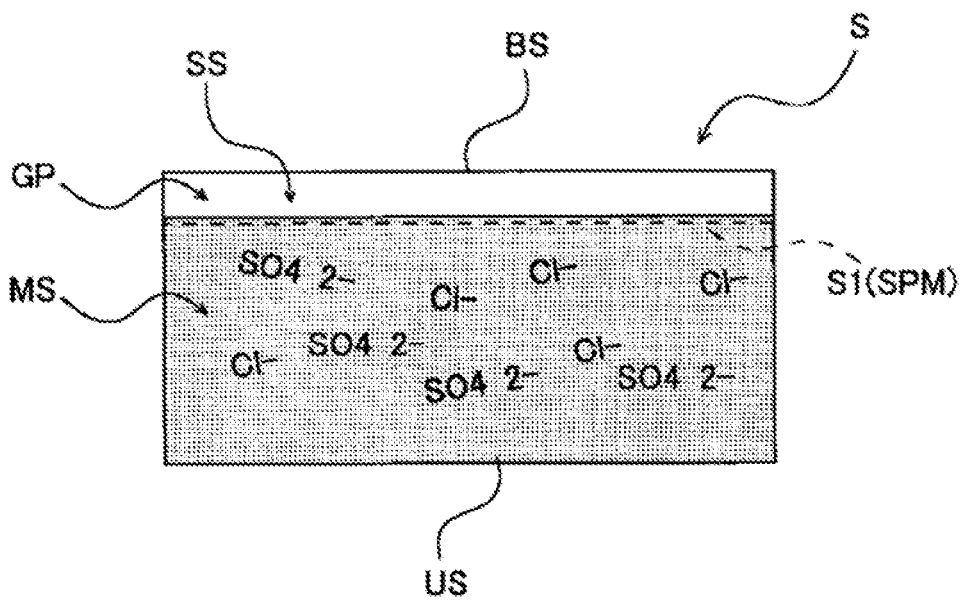

FIGS. 13 and 14 are enlarged views illustrating one of the plurality of cells S, in which FIGS. 13A and 14A illustrate a first state, and FIGS. 13B and 14B illustrate a second state when the cell S is half rotated in the vertical direction. As illustrated in FIG. 13A, a membrane member S1 is provided at a position separated in a height direction in the cell S. The membrane member S1 is an ion exchange membrane IEM that causes a permeation speed of a specific ion and that of another ion to be different from each other. As illustrated in FIG. 14A, the membrane member S1 may be formed of a semipermeable membrane SPM that causes a permeation speed of the ion and that of water to be different from each other.

A gas phase GP is provided in the cell S so as to cope with a change in the volume of the latent heat storage material 90. The membrane member S1 is provided at a position close to an upper surface US or a lower surface BS of the cell S, and partitions the inside of the cell S into a small space SS and a main space MS. Even though the pivot window 5 is half rotated in the vertical direction as described below, the membrane member S1 is provided at a position where the membrane member S1 remains immersed when the latent heat storage material 90 is in a liquid state.

Here, in the pivot window 5 according to the fifth embodiment, for example, the rotation mechanism 60 as illustrated in FIG. 3 is provided, and it is possible to perform an operation in which the laminated body (flat plate body) L including the two sheets of the plate material 10, the sealing member 80, and the latent heat storage material 90 is half rotated vertically. The pivot window 5 may be rotatable in the horizontal direction in addition to the vertical direction.

Next, an operation of the pivot window 5 according to the fifth embodiment will be described with reference to FIGS. 13A and 13B. In the example illustrated in FIGS. 13A and 13B, the latent heat storage material 90 is obtained by adding NaCl which is a freezing point depressant to $Na_2SO_4 \cdot 10H_2O$.

First, in the winter, the cell S is oriented as illustrated in FIG. 13A. That is, the ion exchange membrane IEM is in a state of being located on the lower side. Here, the ion exchange membrane IEM is, for example, a monovalent ion selective permeable anion exchange membrane. Therefore a chlorine ion and water can permeate the ion exchange membrane IEM, and the chlorine ion and the water are located in the small space SS. Therefore, the concentration of the freezing point depressant in the main space MS becomes low. Therefore, the freezing point of the latent heat storage material 90 in the cell S can be increased to, for example, about 26° C., thereby making it possible to obtain a latent heat storage window for the winter that provides the temperature control effect of heating the room.

On the other hand, for example, in the summer, the laminated body L is half rotated in the vertical direction by using the rotation mechanism 60 as illustrated in FIG. 3 while maintaining the left and right positions of the laminated body L. In this case, the result is shown as illustrated in FIG. 13B. That is, most of the small space SS becomes the gas phase GP. Most of the chlorine ion and the water existing in the small space SS in FIG. 13A shift to the main space MS. As a result, the concentration of the freezing point depressant in the main space MS becomes high. Thus, the freezing point of the latent heat storage material 90 in the cell S can be lowered to, for example, about 18° C., thereby making it possible to obtain a latent heat storage window for the summer that provides the temperature control effect of cooling the room.

An operation of the pivot window 5 according to the fifth embodiment will be described with reference to FIGS. 14A and 14B. In the example illustrated in FIGS. 14A and 14B, the latent heat storage material 90 is $Na_2SO_4 \cdot 10H_2O$.

First, in the winter, the cell S is oriented as illustrated in FIG. 14A. That is, the semipermeable membrane SPM is in a state of being located on the lower side. Here, since the semipermeable membrane SPM has a significantly low ion permeation speed, water is located in the small space SS, the concentration of the latent heat storage material 90 in the main space MS increases. Therefore, the freezing point of the latent heat storage material 90 in the cell S can be increased to, for example, about 26° C., thereby making it possible to obtain the latent heat storage window for the winter that provides the temperature control effect of heating the room.

On the other hand, in the summer, the laminated body L is half rotated in the vertical direction by using the rotation mechanism 60 as illustrated in FIG. 3 while maintaining the left and right positions of the laminated body L. In this case, the result is shown as illustrated in FIG. 14B. That is, most of the small space SS becomes the gas phase GP. Most of the water existing in the small space SS in FIG. 14A shift to the main space MS. As a result, the concentration of the latent heat storage material 90 in the main space MS becomes low. Therefore, the freezing point of the latent heat storage material 90 in the cell S can be lowered to, for example, about 18° C., thereby making it possible to obtain the latent heat storage window for the summer that provides the temperature control effect of cooling the room.

As described above, according to the pivot window 5 of the fifth embodiment, in the same manner as that of the first embodiment, the temperature control effect can be provided to the indoor side even though any one of the surfaces becomes the outdoor side.

The temperature control effect to be provided is configured to be different depending on which of the first plate material 10a and the second plate material 10b becomes the outdoor side. Therefore, the surface that becomes the outdoor side is selected according to the environment, thereby making it possible to obtain the temperature control effect (air conditioning effect) according to the environment.

Since it is possible to perform the rotation in the vertical direction while maintaining the left and right positions, for example, when the relative positions of the first plate material 10a and the second plate material 10b are switched and the vertical rotation is not performed, an intended temperature control effect can be provided to the indoor side by appropriately performing rotation when the intended temperature control effect cannot be obtained on both surfaces.

Since the plurality of cells S that have the gas phase GP, encapsulate the latent heat storage material 90, and are arranged in the height direction, and the membrane member S1 provided at the position separated in the height direction are provided, the concentrations of the freezing point depressant and the latent heat storage material 90 above and below the membrane member S1 can be changed by performing the vertical rotation, thereby making it possible to change the melting point and the freezing point of the latent heat storage material 90. Accordingly, when the melting point and the freezing point are increased, the heating effect can be provided to the indoor side, and when the melting point and the freezing point are lowered, the cooling effect can be provided to the indoor side.

As described above, while the present invention is described based upon the embodiments, the present invention is not limited to the above-described embodiments, modifications may be added within a range not departing from the spirit of the present invention, and other technologies may be appropriately combined within a possible range. Further, publicly known or well-known technologies may be combined within a possible range.

For example, the rotation mechanism 60 illustrated in FIGS. 3, 6, 7, and 9 is described in the above embodiment, and the rotation mechanism 60 is not limited to the illustrated one. In the pivot window 2 according to the second embodiment, since the upper plate 72 of the slope 70 and the lower plate 71 thereof have the point symmetrical structure with the connection plate 73 interposed therebetween, the slope 70 may be capable of performing the half rotation in the vertical direction. The pivot window 5 according to the fifth embodiment may be also capable of performing the half rotation in the horizontal direction.

The pivot window 2 according to the second embodiment may be provided with a spray unit for spraying mist-like moisture. For example, it is assumed that the outside air temperature is higher than the room temperature in the state illustrated in FIG. 4. In this case, even though the outside air temperature is high when the mist-like moisture is sprayed on the second plate material 10b, an effect of lowering the second plate material 10b up to near a dew point can be obtained. As a result, a state similar to that when the outside air temperature becomes artificially lowered is created, thereby making it possible to provide the cooling effect to the indoor side. The same also applies to the third embodiment.

In the first embodiment, the two sheets of the plate material 10 are formed of the water vapor permeable material, but are not limited thereto. The two sheets of the plate material 10 may be formed of a water vapor impermeable material. In this case, for example, pipes are connected respectively to the first triangular prism 31 and the second triangular prism 41, whereby water vapor is configured to be able to be discharged to the outside of the room through the pipe when the hygroscopic liquid Li is regenerated, and humidity from the room is configured to be able to be taken into the hygroscopic liquid Li through the pipe.

While various embodiments are described with reference to the drawings, it goes without saying that the present invention is not limited to such examples. It is obvious that those skilled in the art can come up with various changes or modifications within the scope of the claims, and it is understood that those changes or modifications naturally also belong to the technical scope of the present invention. Further, respective components in the above-described embodiments may be freely combined with each other within the scope not departing from the spirit of the invention.

What is claimed is:

1. A rotary fitting, comprising:
a flat plate body capable of rotating in a state where a first surface is directed outdoors and in a state where a second surface is directed outdoors, wherein the flat plate body uses at least one of solar heat, atmospheric heat, atmospheric humidity, and the concentration of a specific gas in the atmosphere such as atmospheric oxygen concentration, atmospheric carbon dioxide concentration, and atmospheric volatile organic compound (VOC) concentration, and provides an air conditioning effect to a room in both of the state where the first surface is directed outdoors and the state where the second surface is directed outdoors,
the rotary fitting further comprising:
a rotation mechanism capable of rotating in a horizontal direction while maintaining a vertical position of the flat plate body,
wherein
the flat plate body includes: two sheets of a plate material that form a space sandwiched between the two sheets of the plate material; a liquid that is encapsulated between the two sheets of the plate material; and a slope that forms a liquid circulation structure in which a storage part of the liquid is formed on one plate material side of the two sheets of the plate material, the liquid in the storage part evaporated by heat of the one plate material side reaches the other plate material side, and the liquid condensed on the other plate material side is returned to the storage part again.

\* \* \* \* \*